(12) United States Patent
Demers

(10) Patent No.: US 10,866,721 B1
(45) Date of Patent: *Dec. 15, 2020

(54) SELECTING PROPERTIES USING HANDHELD CONTROLLERS

(71) Applicant: Valve Corporation, Bellevue, WA (US)

(72) Inventor: Joe Demers, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,112

(22) Filed: Sep. 20, 2019

(51) Int. Cl.
| | |
|---|---|
| *G06F 3/0487* | (2013.01) |
| *A63F 13/42* | (2014.01) |
| *A63F 13/533* | (2014.01) |
| *G06F 3/0338* | (2013.01) |
| *A63F 13/40* | (2014.01) |
| *G06F 3/0482* | (2013.01) |
| *G06F 3/0484* | (2013.01) |

(52) U.S. Cl.
CPC ............ *G06F 3/0487* (2013.01); *A63F 13/40* (2014.09); *A63F 13/42* (2014.09); *A63F 13/533* (2014.09); *G06F 3/0338* (2013.01); *G06F 3/0482* (2013.01); *G06F 3/04845* (2013.01); *G06F 3/04847* (2013.01); *A63F 2300/308* (2013.01)

(58) Field of Classification Search
None
See application file for complete search history.

(56) References Cited

U.S. PATENT DOCUMENTS

| | | | | |
|---|---|---|---|---|
| 5,334,992 A | * | 8/1994 | Rochat | G06F 3/04845 345/22 |
| 7,180,524 B1 | * | 2/2007 | Axelrod | G09G 5/02 345/593 |
| 2002/0030700 A1 | * | 3/2002 | Arnold | G06F 3/04842 715/810 |
| 2004/0221243 A1 | * | 11/2004 | Twerdahl | G06F 3/0482 715/834 |
| 2008/0217075 A1 | * | 9/2008 | Gordner | G06F 3/0234 178/18.01 |
| 2009/0160695 A1 | * | 6/2009 | Yokota | G06F 3/04892 341/176 |
| 2011/0074809 A1 | * | 3/2011 | Chen | G06T 19/00 345/619 |
| 2011/0105231 A1 | * | 5/2011 | Ambinder | A63F 13/24 463/38 |
| 2011/0261201 A1 | * | 10/2011 | Fujii | B60R 1/00 348/148 |

(Continued)

OTHER PUBLICATIONS

Non Final Office Action dated Jun. 9, 2020 for U.S. Appl. No. 16/430,255 "Selecting Properties using Handheld Controllers", Demers, 21 pages.

(Continued)

*Primary Examiner* — Amy M Levy
(74) *Attorney, Agent, or Firm* — Lee & Hayes, P.C.

(57) ABSTRACT

Described herein are, among other things, techniques to enable a user to navigate a color picker or other graphical-user-interface (GUI) tool using an input device of a handheld controller. For example, a user may operate a color picker presented on a display by pressing upwards on a joystick to activate selection of hue. In some instances, the user may also operate the joystick to alter a tint, tone, shade, or brightness.

20 Claims, 15 Drawing Sheets

(56) References Cited

U.S. PATENT DOCUMENTS

2016/0188133 A1* 6/2016 Renard ................ G06F 3/0488
  715/771
2016/0283106 A1* 9/2016 Thorne .............. H04N 5/23216

OTHER PUBLICATIONS

The PCT Search Report and Written Opinion dated Jul. 7, 2020 for PCT application No. PCT/US20/35845, 11 pages.

\* cited by examiner

SELECTING PROPERTIES USING HANDHELD CONTROLLERS

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, or the like. While current handheld controllers provide a range of functionality, further technical improvements may enhance user experiences.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
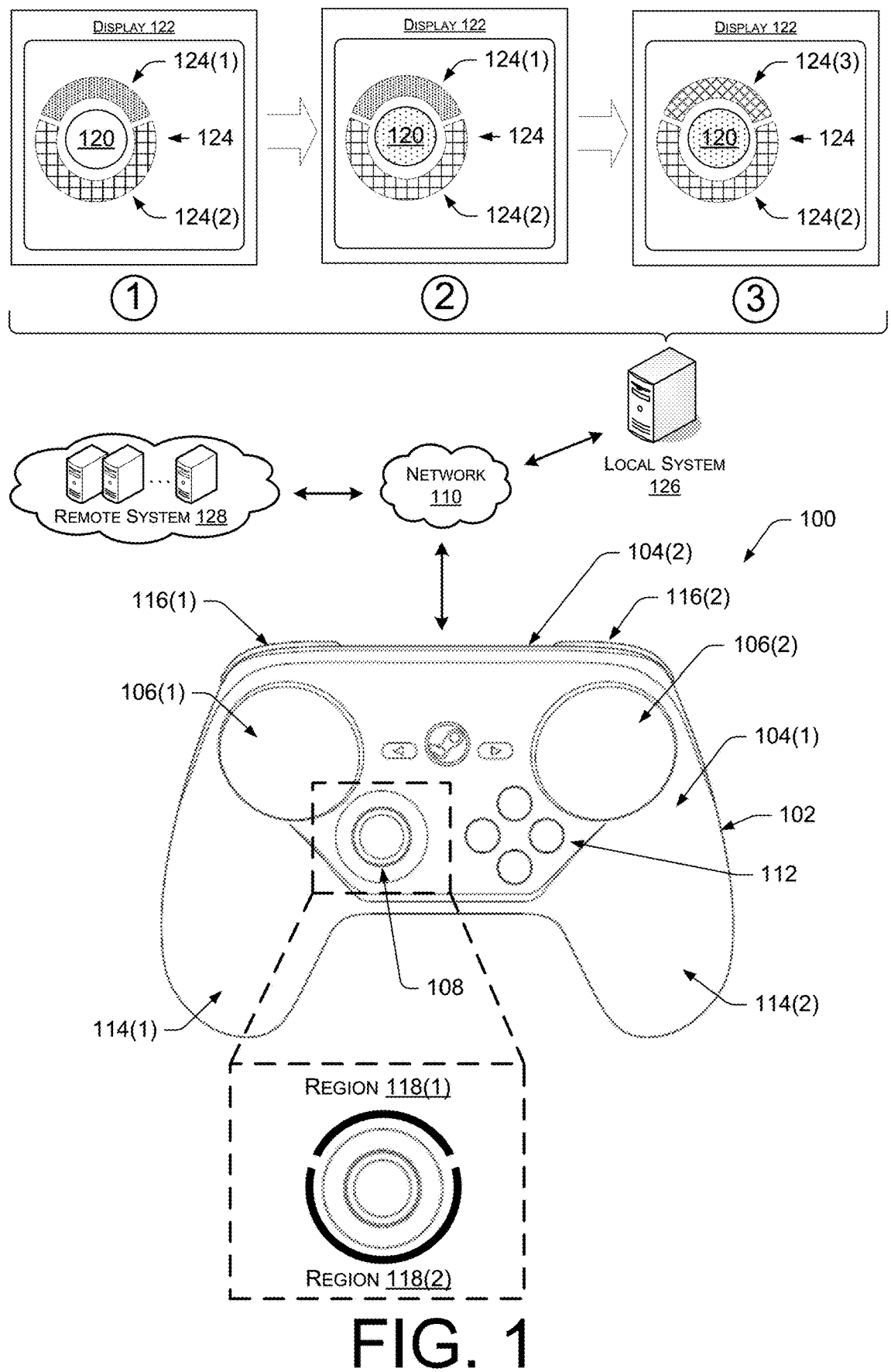
FIG. 1 illustrates an example architecture in which a user may use a handheld controller to interact with virtual objects presented on a display. The handheld controller, a local system, and/or a remote system may include functionality to alter properties of the virtual objects, such as hue, tint, tone, or shade, and/or brightness. As illustrated, in some instances a joystick or other input device of the handheld controller may be used to interact with a color picker for selecting the hue, tint, tone, shade, and/or brightness of a displayed virtual object.

As described above, handheld controllers are used in a range of environments and include a range of functionalities. For example, handheld controllers may be used to operate video games, navigate video content, or interact with any other application. In some instances, handheld controllers may be used to select values of different properties of virtual objects or other types of content represented on a display. For example, handheld controllers may be used to select a font of a text presented on a display, line spacing of the text, a color of a virtual object, or the like.

Described herein are techniques for enabling a user to operate a handheld controller for selecting values for different properties, or settings, of content presented on a display. For example, the techniques may enable a user to operate a color picker to select hues, tints, tones, or shades of the hue, and/or brightness (or gray-scale) of the hue associated with a virtual object presented on a display. In some instances, the user may operate an input device of the handheld controller, such as joystick, trackpad, directional pad, or the like, to select which property the user would like to adjust, as well as to select a value associated with the desired property.

In some instances, the input device of the handheld controller may be operable to provide inputs at different locations, areas, or regions on the input device. For instance, a user may operate a joystick of the handheld controller to provide an input that begins at a center location and moves towards an outer edge of a range of the joystick. In addition, a user may operate a trackpad by providing an input (e.g., using a finger, stylus, or the like) that is detectable by a touch sensor to indicate movement of the input across the trackpad.

In some instances, different regions of the input devices may be associated with different properties that may be selected and adjusted. Furthermore, regions of the input devices may be associated with the different properties during different periods of time, or instances. For example, envision that a user wishes to operate a color picker, a type of graphical user interface (GUI) tool, to select respective values for different properties of a color, such as hue, tint, tone, or shade, and/or brightness (or gray-scale). Of course, while three example properties are described, it is to be appreciated that any other number and/or type of properties may be adjusted. In some instances, initially, a first region of the joystick or trackpad may be associated with a first property and a second region with a second property. For example, in instances where the range-of-motion of the joystick or the shape of the trackpad are circular or elliptical, a first range of outer positions of the joystick or trackpad may be associated with the first property and a second range of outer positions may be associated with the second property. In some instances, if the user selects to modify the second property, a third region of the joystick or trackpad may be associated with a third property. In some instances, the third region may replace, or be presented in lieu of, the first region. Therein, the user may choose to select the second property and/or the third property.

To further illustrate, initially, the user may operate the joystick or trackpad to select one of the two properties to modify. For example, a top arc of the joystick may be associated with the first property, such as hue, and a bottom arc of the joystick may be associated with the second property, such as tints, tones, and/or shades of the hue. To modify or otherwise select hue, a user may push the joystick upwards. In response, a color picker illustrated on a display may present an indication that the user has selected to modify a hue of a color for example. After the color picker has highlighted or otherwise indicated that the user has selected to modify hue, the user may move the joystick around the top arc, or around an even larger arc, to change the value of the hue. For example, the illustrated color picker may indicate that the user may move the joystick generally left or right along the outer range of the joystick to select orange, yellow, green, blue, red, and the like. In other examples, the user may scroll through hue options by holding the joystick upward (or at other directions within the top arc), which may cause the hue options to scroll. After finding the desired hue, the user may return the joystick from its current position to the center position. For example, the user may release the joystick upon selecting the desired hue and the joystick may be biased back to its center position. Additionally, or alternatively, the user may depress (e.g., click) the joystick to indicate a selection of the desired hue.

In some instances, after selecting the hue, or while selecting the hue, the display may present an indication of the hue being selected. For example, the display may include a brush, vial, paint splotch, or container that represents the selected hue or a currently highlighted hue. In this sense, the indication may be colored or displayed to represent the selected hue. The display may also present a virtual object in the selected hue.

After the user has selected the hue, the color picker may be operable to modify the first property or the second property. For example, the user may push the joystick upwards to modify or otherwise select hue, as described above, to select a different hue. Alternatively, after selecting the hue, the user may activate selection of the second property. For example, the bottom arc of the joystick may be associated with the second property (e.g., tint, tone, shade), and the user may push the joystick downward. In response, the color picker presented on the display may be updated to indicate that the user may now select a tint, tone, or shade of the hue. In some instances, the tint, tones, and/or shades may represent categories, or characteristics, of the colors, such as saturation and brightness. Thereafter, the user may move the joystick around the bottom arc associated with the second property (or a different arc) to select the desired value. In other examples, the user may scroll through the tints, tones, or shades by holding the joystick downward, which may cause the tints, tones, or shades to scroll. In some instances, the presented tints, tones, and/or shades may include saturation and brightness values that are above zero. Upon identifying the desired value, the user may return the joystick to the center position. The display may be updated to present the virtual object according to the selected tint, tone, or shade. For example, the user may release the joystick, which may be biased back to its center position. Additionally, or alternatively, the user may depress (e.g., click) the joystick to indicate a selection of the tint, tone, or shade.

In some instances, after selecting the hue and/or the tint, tone, or shade, the user may push the joystick downward and in response, the color picker presented on the display may be updated to indicate that the user may now select a tint, tone, shade of the hue, as well as a brightness of the hue. For example, based on the user pushing the joystick downward or within a region of outer positions associated with altering the second property, the color picker may associate the first region may be associated with a third property (e.g., brightness). Alternatively, the color picker may display a third region in lieu of the first region to provide the user options to select the brightness. In some instances, the first region and the third region may be of the same size.

To alter the third property, the user may push the joystick downwards to select the tint, tone, or shade, and then may push the joystick upwards to select the brightness. In some instances, the user may alter the third property (or enter a region associated with altering the third property) by pressing the joystick upwards, from a position associated with altering the second property, and around an outer periphery of the joystick to reach the region associated with altering the third property. In response to the user pushing upwards, the color picker illustrated on the display may present an indication that the user has selected to modify the brightness.

After the color picker has highlighted or otherwise indicated that the user has selected to modify the brightness, the user may move the joystick around the top arc, or around an even larger arc, to change the value of the brightness. For example, the illustrated color picker may indicate that the user may move the joystick generally left or right along the outer range of the joystick to select the brightness. In other examples, the user may scroll through brightness options by holding the joystick upward, which may cause the brightness values to scroll. In some instances, moving the joystick into the region associated with altering the brightness may set saturation values to zero such that the user may exclusively pick from varying gray values (or brightnesses). In this sense, the brightness values may be of varying brightness, including black and white, as well as a range of values between the black and white. Therein, the user may scroll through or select among the brightness values. In this sense, in some instances, the second property and the third property (or the regions associated with altering the second property and the third property, may include different variations of saturation and brightness (or allow the user to select among the same set of choices). After finding the desired brightness, the user may return the joystick from its current position to the center position. For example, the user may release the joystick and the joystick may be biased back to its center position. Additionally, or alternatively, the user may depress (e.g., click) the joystick to indicate a selection of the desired brightness. The display may be updated to present the virtual object according to the selected brightness.

In some instances, the color picker may display a predetermined number of hues, tints, tones, or shades, and/or brightness values. For example, the user may choose from a predetermined number of tints, tones, or shades that are associated with the previously selected hue. In some instances, the color picker may display fifteen tints, tones, or shades, or allow the user to select among the fifteen different tints, tones, or shades. By way of illustration, if the hue selection is green, the second region may update to present the selectable tints, tones, or shades of green. The selectable tints, tones, or shades may include saturation and brightness values that are above zero. For example, the second region may present fifteen choices that include a single pure hue (full saturation and brightness), and multiple tints (varying in saturation, full brightness), tones (varying in saturation and brightness) and shades (full saturation, varying in brightness). In some instances, the brightness options may represent an even or equal distribution between white and black variations of the selected hue. Furthermore, in some instances, the some of the values associated with altering the tint, tone, or shade may be similar as some of the values associated with altering the brightness. That is, the tints, tones, shades, and/or brightnesses may include similar choices or may modify similar characteristics of the color.

In some instances, the user may operate a trackpad to select respective values of different properties, such as hue, tint, tone, shade, and/or brightness. For example, a first range of outer positions of the trackpad may be associated with hue and a second range of outer positions of the trackpad may be associated with tints, tones, and/or shade of the hue. Upon the user selecting to modify the tints, tones, or shades, the user may operate the trackpad to select a third property, such as brightness. For example, a third range of outer positions (which may replace or be presented in lieu of the first range of outer positions), may be associated with brightness. Therefore, the user may use her finger, a stylus, or another implement to provide an input (e.g., a touch input) from a center location of the trackpad to a first outer position. In response to determining that the first outer position is associated with selection of the hue or other first property, the display may update the presented color picker to indicate that the user may now alter a value of the hue. The user may move her finger or the implement along the outer positions (e.g., generally clockwise or counterclockwise) to select the desired hue. Additionally, or alternatively, other presentations may be displayed for the user to select the desired hue (e.g., scroll menu, spectrum, etc.). Upon identifying the desired hue, the user may move her finger or other implement back to the center position or may simply remove the finger or implement from the trackpad. In response, the display may be updated to illustrate the virtual object being illustrated by the selected hue.

In some instances, after the user has selected the desired hue, the user may use her finger, stylus, or other implement to provide an input from the center position to a second outer position of the second range of outer positions. In response to determining that the second outer position is associated with selection of the tint, tone, or shade or other second property, the display may update the presented color picker to indicate that the user may now alter a tint, tone, or shade. The user may move her finger or the implement along the outer positions (e.g., generally clockwise or counterclockwise) to select the desired tint, tone, or shade. Additionally, or alternatively, other presentations may be displayed for the user to select the desired tints, tones, or shades (e.g., scroll menu, spectrum, etc.). In some instances, the presented tints, tones, or shades may include saturation and/or brightness values that are above zero. Upon identifying the desired tint, tone, or shade, the user may move her finger or other implement back to the center position or may simply remove the finger or implement from the trackpad. In response, the display may illustrate the virtual object being illustrated by the selected tint, tone, or shade.

Additionally, or alternatively, in some instances, after selecting the hue and/or the tint, tone, or shade, or before selecting the tint, tone, or shade, the user may use her finger, stylus, or other implement to provide an input from the center position to an outer position of the third range of outer positions. That is, the display may update the presented color picker to indicate that the user may now alter a brightness. The user may move her finger or the implement along the outer positions (e.g., generally clockwise or counterclockwise) to select the desired brightness. Additionally, or alternatively, other presentations may be displayed for the user to select the desired brightness (e.g., scroll menu, spectrum, etc.). In some instances, the presented options for altering brightness may include saturation values that are equal to zero to allow the user to select among gray values of varying brightness. Here, the second range of outer positions and the third range of outer positions may be thought of as modifying both saturation and brightness that present the same, or similar choices, to alter properties of the color. Upon identifying the desired brightness, the user may move her finger or other implement back to the center position or may simply remove the finger or implement from the trackpad. In response, the display be updated to illustrate the virtual object being illustrated by the selected brightness.

While the above examples describe using joysticks or trackpads to operate a color picker having multiple properties, it is to be appreciated that the described techniques may apply equally to any other type of input device, such as rollerballs, directional pads, or the like. Further, while the examples described herein are described with reference to altering a color of a virtual object, it is to be appreciated that the techniques may apply equally to selection of any other type of properties, such as font of a text, line spacing, selection of an avatar, or the like.

FIG. 1 illustrates an example architecture in which a user may use a handheld controller 100 to interact with virtual objects presented on a display. While FIG. 1 illustrates one example configuration of a handheld controller 100 that may implement or function with the described techniques, it is to be appreciated that the described techniques apply equally to any other types of handheld controllers having any other type of form factor. In each instance, the respective handheld controller 100, a local system, and/or a remote system may include functionality to alter properties, such as hue, tint, tone, shade, and/or brightness of the virtual objects.

As illustrated, the example handheld controller 100 includes a housing 102 having a front surface 104(1) and a top surface 104(2) potentially along with a back surface opposite the front surface 104(1) and a bottom surface opposite the top surface 104(2). The front surface 104(1) may include one or more front-surface controls that are, in some instances, controllable by one or more thumbs of a user operating the handheld controller 100. These front-surface controls may include one or more trackpads, trackballs, joysticks, buttons, or the like, as described in more detail below. In this example, the front surface 104(1) includes a left trackpad 106(1) controllable by a left thumb of a user and a right trackpad 106(2) controllable by a right thumb of the user. In addition, the handheld controller 100 includes a joystick 108. The handheld controller 100 may further include depressible buttons 112 (e.g., controllable by a right thumb of the user) and additional input devices and/or controls. In this example, the handheld controller 100 also includes a left handle 114(1) and a right handle 114(2) through which a user may hold the handheld controller 100 via left and right hands of the user, respectively.

The top surface 104(2), meanwhile, may include one or more top-surface controls. In the illustrated example, the handheld controller 100 includes a left top-surface control 116(1) and a right top-surface control 116(2). The left top-surface control 116(1) may be operable by a left finger (e.g., middle finger or index finger) of the user, while the right top-surface control 116(2) may be operable by a right finger (e.g., middle finger or index finger) of the user. The top-surface controls 116(1) and 116(2) may be referred to as "triggers" or "bumpers" in some instances. Furthermore, in some instances, one or more of the top-surface controls 116(1) and 116(2) may include one or more touch sensors for detecting a presence, location, and/or gesture of one or more fingers of the user on the respective top-surface control.

FIG. 1 further illustrates that different regions of the joystick 108 may be associated with the selection of different properties, such as hue, tint, tone, shade, and/or brightness of a virtual object 120 presented on a display 122. For instance, FIG. 1 illustrates that the joystick 108 may be associated with a region 118(1), which may correspond to top arc or top half of the joystick 108, and a region 118(2), which may correspond to a bottom arc or bottom half of the joystick 108.

In addition, the region 118(1) and the region 118(2) may be associated with a particular portion of a color picker 124 presented on the display 122. In some instances, the region 118(1) and the region 118(2) may be associated with the particular portions of the color picker 124. For example, at "1" the region 118(1) may be associated with a first portion 124(1) of the color picker 124 and the region 118(2) may be associated with a second portion 124(2) of the color picker 124. In the illustrated example, the first portion 124(1) of the color picker 124 may be selectable to modify a value of a hue of the virtual object 120 and the second portion 124(2) of the color picker 124 may be selectable to modify a value of a tint, tone, or shade of the virtual object 120. To change an illustrated color of the virtual object 120 presented on the display 122, a user of the handheld controller 100 may, for example, move the joystick 108 upwards into an outer position that is within the region 118(1). In response, the color picker 124 may enable selection of a hue of the virtual object. In some examples, the presentation of the color picker 124 may be updated to indicate that the user is now able to select a value of hue. For example, the first portion 124(1) may be accentuated (e.g., enlarged, highlighted, etc.) and/or a prominence of the second portion 124(2) may be lessened (e.g., removed, shrunk, grayed-out, etc.). Further, after the user has activated the first portion 124(1) of the color picker 124, the user may move the joystick left and right, or within the region 118(1), to select a value of the desired hue. In some instances, as the user moves the joystick 108 within the region 118(1) (that is, left or right while pressing the joystick away from the center position), the virtual object 120 may be updated to present the current hue selection.

Upon identifying the desired hue, the user may release the joystick 108, thus causing the joystick 108 to move from its last outer location (or position) back to the center position. Thus, the virtual object 120 may change hue from its previous hue to the selected hue (in instances where the hue does not change until the joystick 108 returns to the center position) or may remain in the selected hue (in instances where the display 122 updates as the user moves within the region 118(1)). As illustrated, the virtual object 120 may be displayed within an interior of the color picker 124. However, the virtual object 120 may be displayed elsewhere on the display 122.

In some instances, after the user has selected the hue, the second portion 124(2) may update to display various tints, tones, and/or shades based at least in part on the selected hue. That is, the tints, tones, and/or shades may be determined, or updated, based on the value of the selected hue. For example, at "2" the user of the handheld controller 100 may move the joystick 108 downwards and into an outer position that is within the region 118(2). In response, the color picker 124 may enable selection of a tint, tone, or shade of the virtual object 120. In some examples, the presentation of the color picker 124 may be updated to indicate that the user is now able to select a value of the tint, tone, or shade. For example, the second portion 124(2) may be accentuated (e.g., enlarged, highlighted, etc.). Further, after the user has activated the second portion 124(2) of the color picker 124, the user may move the joystick 108 within the region 118(2) to select a value of the tint, tone, or shade. In some instances, as the user moves the joystick 108 within the region 118(2), the virtual object 120 may be updated to present the current selection. Upon identifying the desired tint, tone, or shade, the user may release the joystick 108, thus causing the joystick 108 to move from its last outer location (or position) back to the center position. Thus, the virtual object 120 may change to the selected tint, tone, or shade (in instances where the tint, tone, or shade does not change until the joystick 108 returns to the center position) or may remain in the selected tint, tone, or shade (in instances where the display 122 updates as the user moves within the region 118(2)).

Additionally, or alternatively, upon the user of the handheld controller 100 at "2" moving the joystick 108 downwards and into an outer position that is within the region 118(2), the color picker 124 may update to display a third portion 124(3) assigned with a third property, such as brightness. That is, from "2" to "3" in FIG. 1, the first portion 124(1) may no longer be selectable to modify the hue, but instead, the third portion 124(3) may be displayed to enable the user to select a brightness. In some instances, the third portion 124(3) may be the same size as the first portion 124(1), or stated alternatively, the third portion 124(3) may replace the first portion 124(1) on the color picker 124. In such instances, the region 118(1) may be associated with the third property to allow the user to modify the value of the brightness. For example, at "3" the user of the handheld controller 100 may move the joystick 108 upwards and into the outer position that is within the region 118(1). In some instances, from "2" to "3" the user may move the joystick 108 along an outer periphery (either left or right), as opposed to pressing the joystick 108 directly upwards from the region 118(2). That is, the user may scroll along an outer edge to reach the region 118(1) and may avoid a center region to reach the region 118(2) and alter the third property. In response, the color picker 124 may enable selection of a brightness of the virtual object 120. In some examples, the presentation of the color picker 124 may be updated to indicate that the user is now able to select a value of brightness. For example, the third portion 124(3) may be accentuated (e.g., enlarged, highlighted, etc.) and/or a prominence of the remaining second portion 124(2) may be lessened (e.g., removed, shrunk, grayed-out, etc.). Further, after the user has activated the third portion 124(3) of the color picker 124, the user may move the joystick 108 within the region 118(1) to select a value of the desired brightness. In some instances, as the user moves the joystick 108 within the region 118(1), the virtual object 120 may be updated to present the current brightness. Upon identifying the desired brightness, the user may release the joystick 108, thus causing the joystick 108 to move from its last outer location (or position) back to the center position. Thus, the virtual object 120 may change in brightness from its previous selection to the selected brightness (in instances where the brightness does not change until the joystick 108 returns to the center position) or may remain in the selected brightness (in instances where the display 122 updates as the user moves within the region 118(2)).

While the above discussion at "3" relates to selecting brightness, the user at "3" may, in some instances, move the joystick 108 within the region 118(2) to enable selection of the tint, tone, or shade (as discussed above). In such instances, the user may scroll along the outer periphery of the joystick 108 between the region 118(1) and the region 118(2), and vice versa. After selecting a tint, tone, or shade, the user may release the joystick to move from its last outer location (or position) back to the center position. In response, the color picker 124 may present the first portion 124(1) for modifying hue and the second portion 124(2) for modifying the tint, tone, or shade (as shown at "1" in FIG. 1). Alternatively, in some instances, after selecting the brightness and releasing the joystick 108, the color picker 124 may present the second portion 124(2) and the third portion 124(3). Therein, the user may move the joystick 108 within the region 118(1) to enable selection of the brightness, or may move the joystick 108 with the region 118(2) to enable selection of the tint, tone, or shade.

In some instances, the display 122 may present a limited, or predetermined number of hues, tints, tones, shades, and/or brightnesses, or values associated therewith. For example, after selecting the hue, the tints, tones, and shades may be limited to a predetermined number, such as fifteen. In some instances, the fifteen tints, tones, or shades may represent an equal distribution of tints, tones, or shades associated with the selected hue. For example, if the user selects red as the hue, the tints (e.g., between pure white and pure hue), tones (e.g., between pure hue and pure gray), and shades (e.g., between pure hue and pure black) may include fifteen different tints, tones, or shades of red, from dark red to light red. In other words, and in some instances, the fifteen choices may include a single pure hue (full saturation and brightness), and multiple tints (varying in saturation, full brightness), tones (varying in saturation and brightness) and shades (full saturation, varying in brightness). In some instances, the tints, tones, and/or shades may be based at least in part on the selected brightness, or the value selected by the user. Additionally, or alternatively, the brightness values may be based at least in part on the selected the tint, tone, and/or shade.

It is to be appreciated that while FIG. 1 illustrates an example configuration of using an input device to alter properties of content on the display 122, other configurations are possible. For example, the number, orientation, size, shape, and other characteristics of the region 118(1) and the region 118(2) may be the same or different than illustrated. Further, the properties are hue, tint, tone, shade, and brightness are merely illustrative, and other properties may be altered using the described techniques. Further, input devices other than the joystick may be used with the described techniques, such as a trackpad 106(1) as illustrated and described below with reference to FIGS. 3A-3D.

In addition, FIG. 1 illustrates that the handheld controller 100 may communicate with a local system 126 and/or a remote system 128 over one or more wired and/or wireless networks 110. The local system 126 and/or the remote system 128 may, in some instances, provide content for presentation on the display 122, such as the illustrated virtual object 120. Further, the functionality for launching the color picker 124 and altering corresponding properties may be performed at the handheld controller 100, the local system 126, the remote system 128, or a combination thereof. That is, one or more of the handheld controller 100, the local system 126, and/or the remote system 128 may perform the operations described below.

Figure 2A:
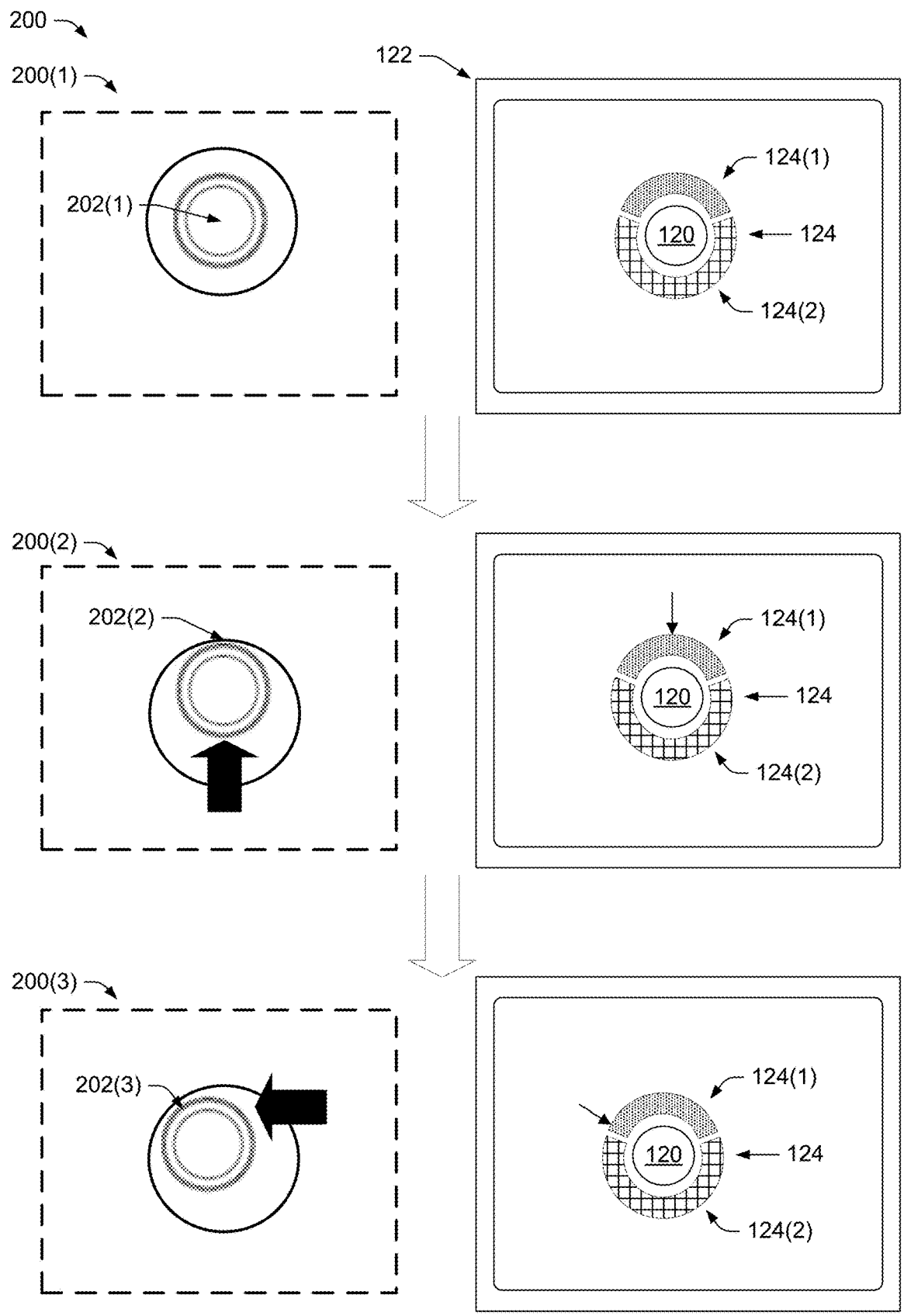
FIG. 2A illustrates an example flow of operations where a user moves a joystick of a handheld controller from a center position to a first defined outer region to enable selection of a property, such as hue of a virtual object. After the joystick moves to this region, the user may use the joystick to select the hue using a color picker presented on a display.

FIG. 2A illustrates an example flow of operations 200 where a user moves a joystick of a handheld controller from a center position 202(1) to a first defined outer region to enable selection of a first property, such as hue of a virtual object. After the joystick moves to this region, the user may use the joystick to select a hue (or other property) using a color picker presented on a display.

As illustrated at 200(1), a display 122 may present a virtual object 120 and a color picker 124 to enable a user to modify a hue of the virtual object 120. For example, the user may issue a request to launch the color picker 124 using a handheld controller or in any other manner. As shown, the color picker 124 may include a first portion 124(1) for selecting hue and a second portion 124(2) for selecting tints, tones, and/or shades. As illustrated at 200(1), the joystick may initially reside in the center position 202(1).

At 200(2), the user may bias the joystick generally upwards and into an outer position 202(2) that is within a region of outer positions associated with altering the hue of the virtual object 120. In response to the joystick being moved into this region, the color picker 124 may indicate that the first portion 124(1) of the color picker 124 for selecting a hue has been activated. In addition, the hue of the virtual object 120 may be updated to indicate the current hue corresponding to the location of the joystick with the first portion 124(1).

At 200(3), the user moves the joystick to the left to another outer position 202(3), thus changing the value of the hue. The first portion 124(1) of the color picker 124 may be updated to reflect the new selection. Additionally, or alternatively, the hue of the virtual object 120 may update to reflect the selected hue. Upon identifying the desired hue, the user may release the joystick, causing the joystick to bias to the center position 202(1).

Figure 2B:
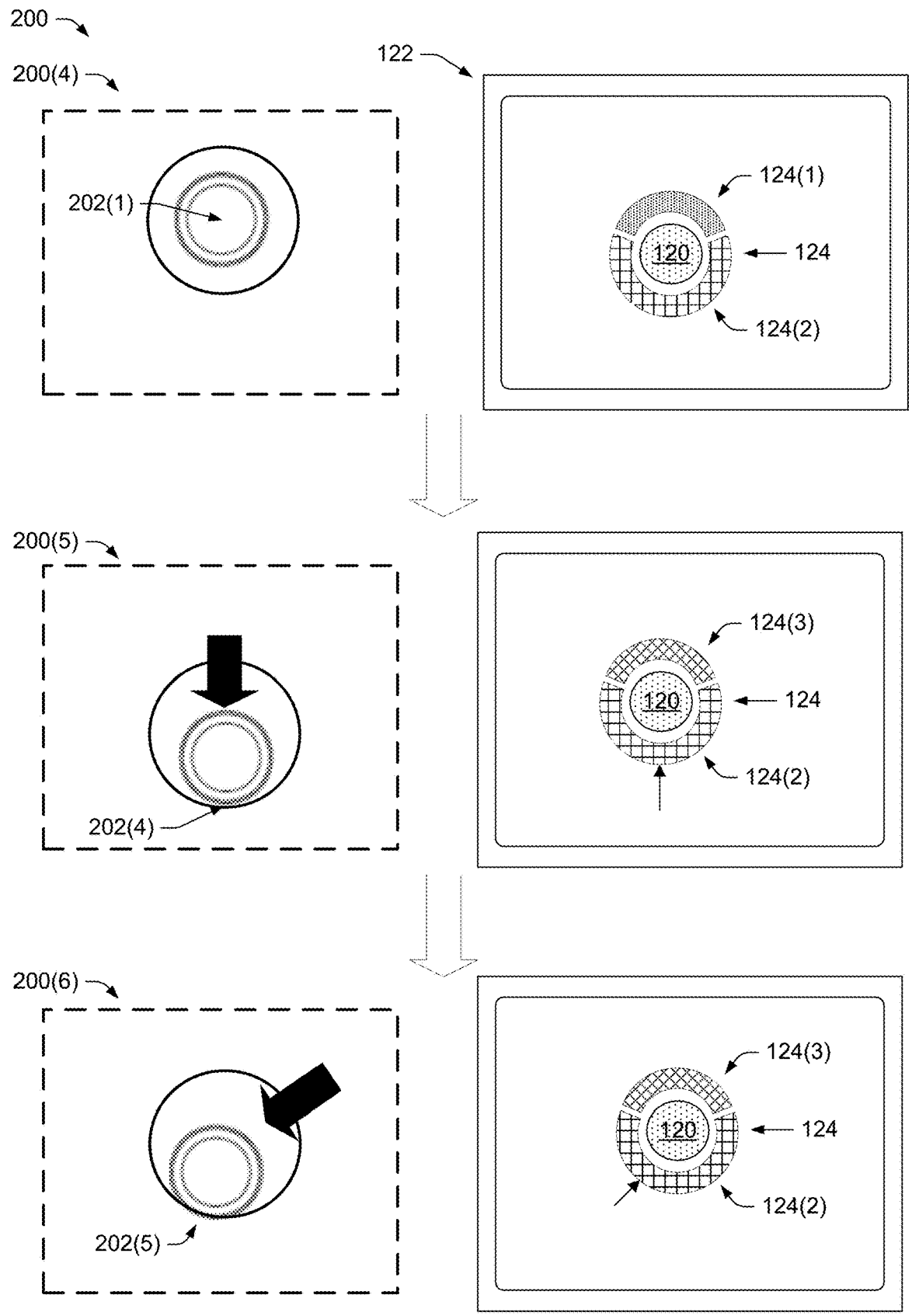
FIG. 2B illustrates an example flow of operations where the user moves the joystick from the center position to a second defined outer region to enable selection of an additional property, such as a tint, tone, or shade of the virtual object. After the joystick moves to this region, the user may use the joystick to select the tint, tone, or shade using the color picker presented on the display.

FIG. 2B continues the flow of operations 200 after the user has selected the desired hue. At 200(4), the display 122 may present the virtual object 120 according to the hue selected in FIG. 2A and may also display the color picker 124. At 200(4), the joystick may reside in the center position 202(1).

At 200(5), the user may bias the joystick generally downwards and into an outer position 202(4) that is within a region of outer positions associated with altering the tint, tone, and/or shade of the virtual object 120. In response to the joystick being moved into this region, the color picker 124 may indicate that the second portion 124(2) of the color picker 124 for selecting the tint, tone, and/or shade has been activated. In addition, the tint, tone, and/or shade of the virtual object 120 may be updated to indicate the current tint, tone, or shade corresponding to the location of the joystick. The second portion 124(2) may include multiple values of each of tints (varying in saturation, full brightness), tones (varying in saturation and brightness) and shades (full saturation, varying in brightness).

Additionally, as illustrated, the color picker 124 may be updated to illustrate a third portion 124(3) for selecting a brightness of the virtual object 120. In some instances, in response to the joystick being moved into the outer position 202(4) that is within a region of outer positions associated with altering the tint, tone, and/or shade (or another position within the region of outer positions associated with altering the tine, tone, and/or shade), the color picker 124 may include the third portion 124(3) for selecting the brightness. In other words, and in some instances, the third portion 124(3) may replace first portion 124(1).

At 200(6), the user moves the joystick down and to the left to another outer position 202(5), thus changing the value of the tint, tone, or shade. As illustrated, the second portion 124(2) of the color picker 124 may be updated to reflect the new selection. In addition, or in the alternative, the tints, tones, or shades of the virtual object 120 may be updated to reflect the selected tint, tone, or shade. Upon identifying the desired tint, tone, or shade, the user may release the joystick, causing the joystick to bias back to the center position 202(1). At this point, the second portion 124(2) of the color picker 124 might no longer be activated for selecting a tint, tone, or shade of the virtual object 120.

Figure 2C:
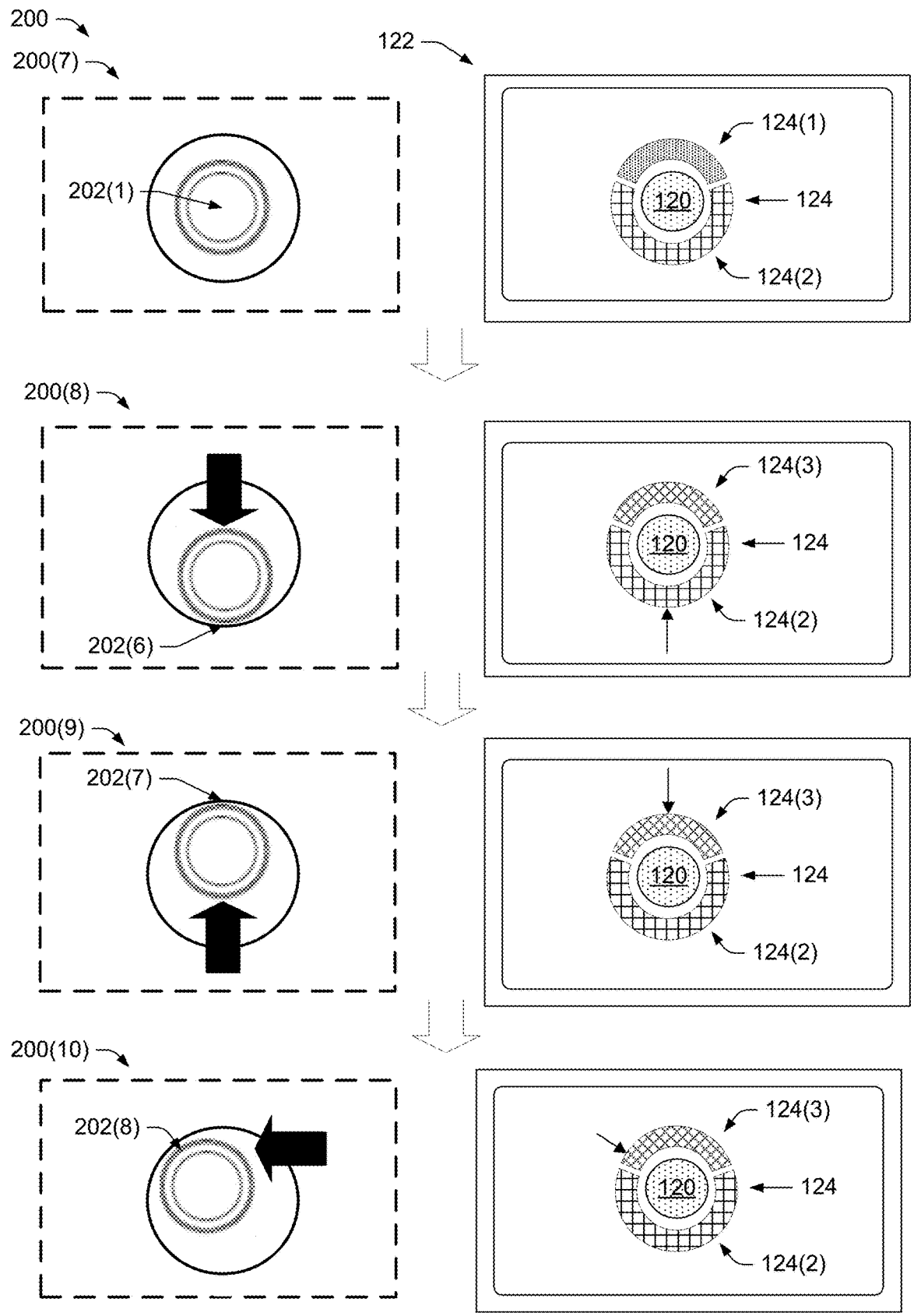
FIG. 2C illustrates an example flow of operations where the user moves the joystick from the center position to the second defined outer region and then into a third defined outer region to enable selection of another property, such as a brightness of the virtual object. After the joystick moves to this region, the user may use the joystick to select the brightness using the color picker presented on the display.

FIG. 2C continues the flow of operations 200 after the user has selected the desired hue and/or the tint, tone, or shade. The display 122 may display the color picker 124. At 200(7), the joystick may initially reside in the center position 202(1). As illustrated at 200(7), the display 122 may present the virtual object 120 according to the hue selected in FIG. 2A and/or the tint, tone, and/or shade selected in FIG. 2B. FIG. 2C also illustrates that initially, the color picker 124 may include the first portion 124(1) and the second portion 124(2).

At 200(8), the user may bias the joystick generally downwards and into an outer position 202(6) that is within a region of outer positions associated with altering the tint, tone, and/or shade of the virtual object 120. In response to the joystick being moved into this region, the color picker 124 may be updated to illustrate the third portion 124(3) for selecting the brightness. In other words, in some instances, altering or selecting a brightness may be accessed or made available by initially moving the joystick into the outer position 202(6) (or another position) that is within a region of outer positions associated with altering the tint, tone, and/or shade. Here, the color picker 124 may no longer display the first portion 124(1), but instead, may display the third portion 124(3). In some instances, the third portion 124(3) may correspond to the first portion 124(1) in that the third portion 124(3) may replace the first portion 124(1). Further, while the third portion 124(3) and the second portion 124(2) are shown as being discrete portions, in some instances, the third portion 124(3) and the second portion 124(2) may be continuous.

At 200(9), the user may bias the joystick generally upwards and into an outer position 202(7) that is within a region of outer positions associated with altering the brightness of the virtual object 120. In response to the joystick being moved into this region, the color picker 124 may indicate that the third portion 124(3) of the color picker 124 for selecting the brightness has been activated. In addition, the brightness of the virtual object 120 may be updated to indicate the current brightness corresponding to the location of the joystick. Although FIG. 2C and 200(9) illustrate a particular movement of the joystick 108 (e.g., directly upwards), in some instances, the user may scroll along an outer periphery or edge to reach the region associated with altering the third property. In other words, the user may avoid a center position and scroll around the center position and along an outer edge to reach a range of outer positions associated with altering the third property.

In some instances, if the user desires to select a value associated with the brightness, as shown at 200(10), the user moves the joystick to the left to another outer position 202(8), thus changing the value of the brightness. The third portion 124(3) of the color picker 124 may be updated to reflect the new selection. In addition, or in the alternative, the brightness of the virtual object 120 may be updated to reflect the selected value. Upon identifying the desired grayscale, the user may release the joystick, causing the joystick to bias back to the center position 202(1).

Figure 2D:
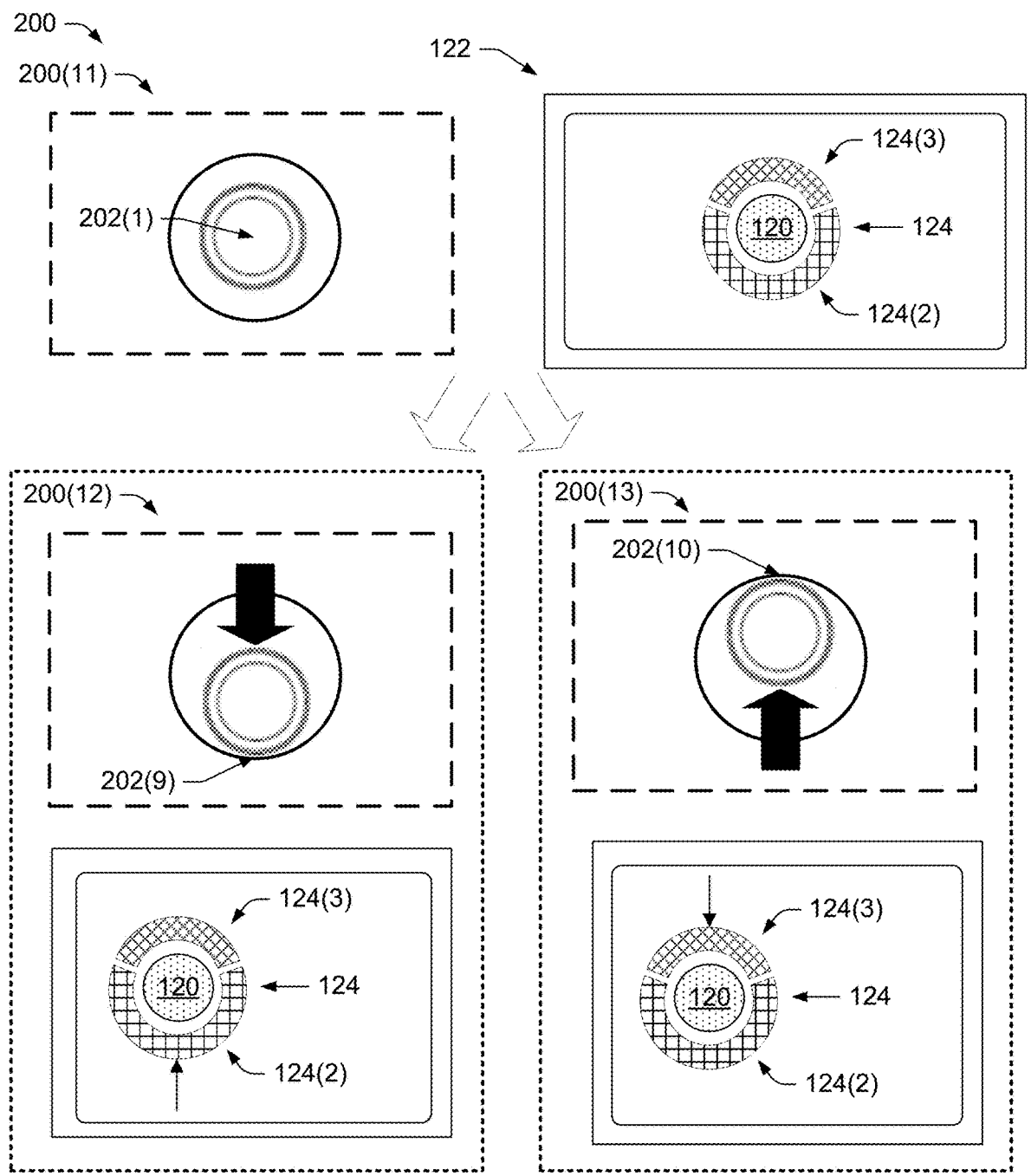
FIG. 2D illustrates as example flow of operations where the user moves the joystick to enable selection of one or more properties of the virtual object.

FIG. 2D continues the flow of operations 200 after the user has selected the desired brightness. At 200(11), the joystick may initially reside in the center position 202(1). At 200(11), the display 122 may present the virtual object 120 according to the hue selected in FIG. 2A, the tint, tone, and/or shade selected in FIG. 2B, and the brightness selected in FIG. 2C. FIG. 2D also illustrates that initially, the color picker 124 may include the second portion 124(2) and the third portion 124(3) after the user has selected brightness.

From 200(11) the user may bias the joystick generally downwards and into an outer position 202(9) that is within a region of outer positions associated with altering the tint, tone, and/or shade of the virtual object 120, as shown by 200(12), and/or may bias the joystick generally upwards and into an outer position 200(10) that is within a region of outer positions associated with altering the brightness of the virtual object 120, as shown by 200(13). Therein, as discussed above, the user may alter the tint, tone, or shade, as discussed in FIG. 2B, or may alter the brightness, as discussed in FIG. 2C. In some instances, the user may therefore utilize the second portion 124(2) and/or the third portion 124(3) for modifying both saturation and brightness as they may include the same set of choices.

Figure 3A:
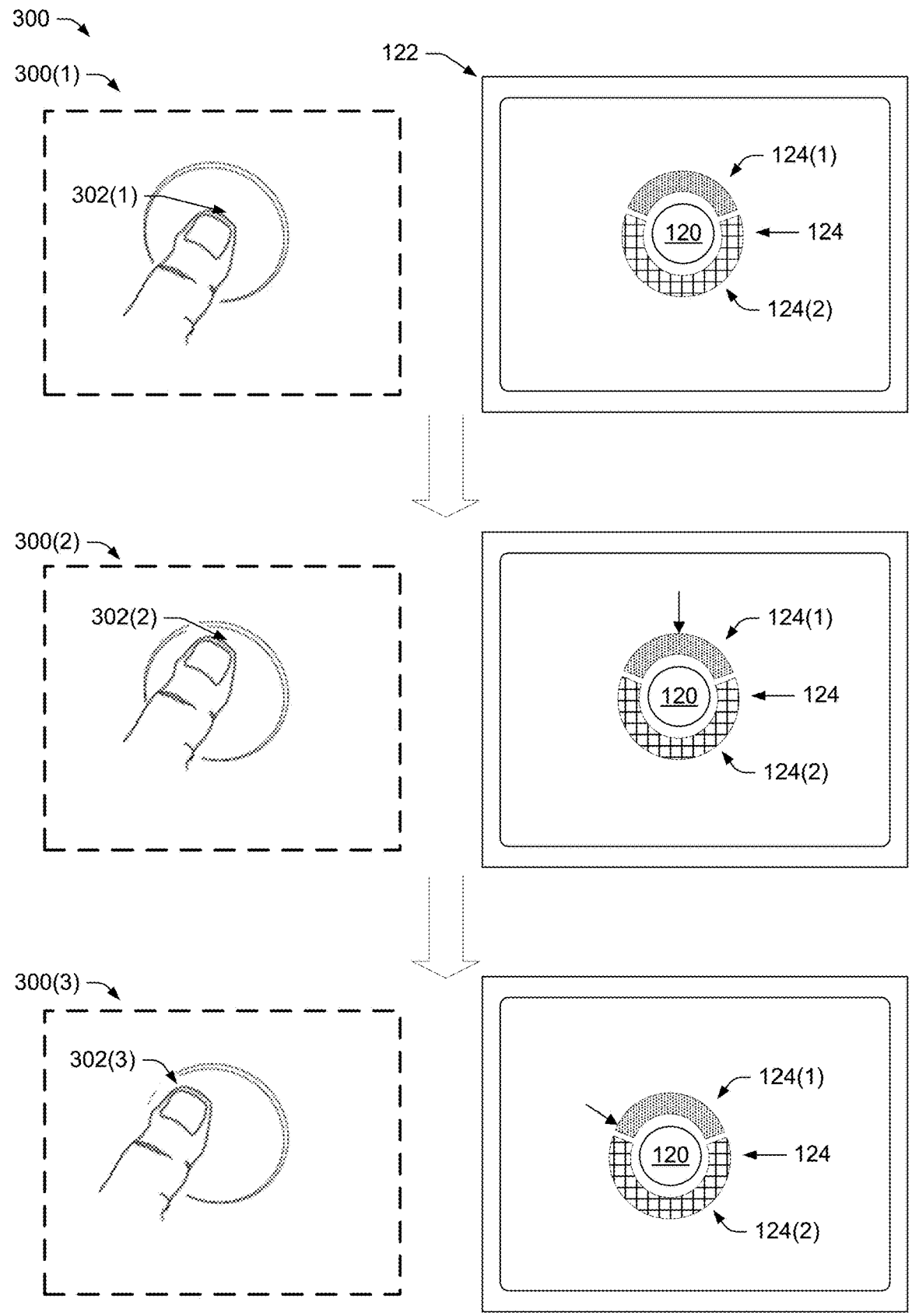
FIG. 3A illustrates an example flow of operations where the user provides an input to an input device of a handheld controller (in this example, a trackpad) at a first defined outer region to enable selection of a property, such as hue of a virtual object. After this input is received, the user may use a trackpad or other input device to select the hue using the presented color picker.

FIG. 3A illustrates an example flow of operations 300 where the user provides an input to an input device of a handheld controller (in this example, a trackpad) a first defined outer region to enable selection of a first property, such as hue of a virtual object. After this input is received, the user may use a trackpad or other input device to select the hue or other property using the presented color picker.

For example, as illustrated at 300(1), a display 122 presents a virtual object 120 and a color picker 124 to enable a user to modify color properties of the virtual object 120. The user may issue a request to launch the color picker 124 using the handheld controller or in any other manner. In some instances, initially, the color picker 124 may display a first portion 124(1) and a second portion 124(2).

At 300(1), an implement (e.g., a finger, stylus, etc.) may initially reside in or otherwise correspond to (e.g., hover over) the center position 302(1). However, it is to be appreciated that this while this example describes the input starting at a center position and moving towards the first defined outer region, in some instances the input may simply be received at the first outer region for enabling selection of the first property or may begin at any other portion of the trackpad before moving to the first outer region.

At 300(2), the user may provide a touch input (e.g., via a finger, stylus, etc.) that is upwards from the center position 302(1) and into an outer position 302(2) that is within a region of outer positions associated with altering hue of the virtual object 120. In response to this input into this region, the color picker 124 may indicate that the first portion 124(1) of the color picker 124 for selecting a hue has been activated. In addition, the hue of the virtual object 120 may be updated to indicate the current hue corresponding to the current location of the touch input.

At 300(3), the user provides an input to the left to another outer position 302(3), thus changing the value of the hue. As illustrated, the first portion 124(1) of the color picker 124 may be updated to reflect the new selection. In addition, or in the alternative, the hue of the virtual object 120 may be updated to reflect the selected hue. Upon identifying the desired hue, the user may provide an input towards the center position 302(1) or may simply remove the touch input (e.g., lift her finger from the trackpad).

Figure 3B:
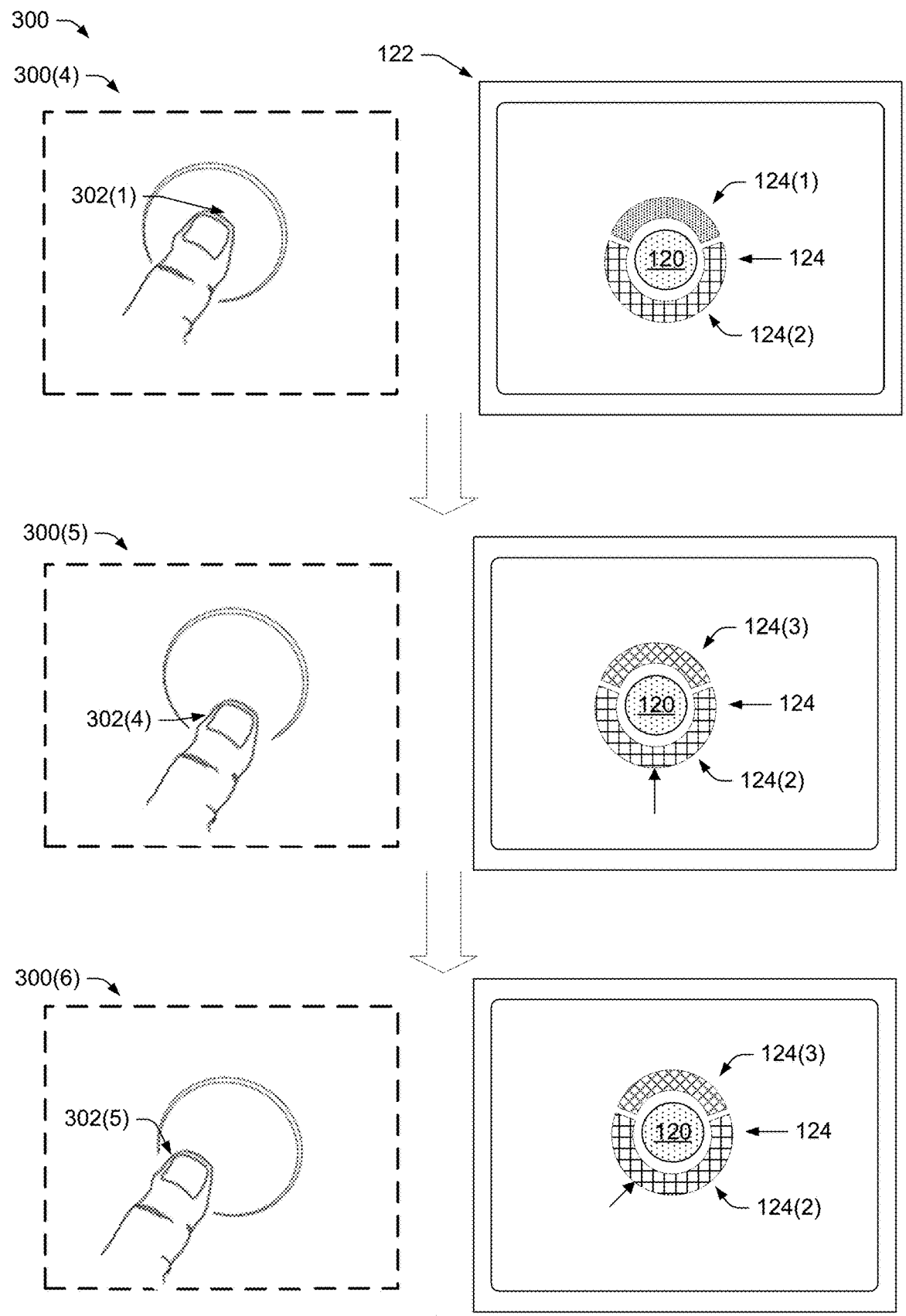
FIG. 3B illustrates an example flow of operations where the user provides an input to the trackpad at a second defined outer region to enable selection of an additional property, such as a tint, tone, or shade of the virtual object. After this input is received, the user may use the trackpad or other input device to select the tint, tone, or shade using the presented color picker.

FIG. 3B continues the flow of operations 300 after the user has selected the desired hue to enable selection of an additional property of a virtual object. As illustrated at 300(4), the display 122 may present the virtual object 120 according to the hue selected in FIG. 3A and may also display the color picker 124. At 300(4), the touch input or the implement may initially reside in or otherwise correspond to (e.g., hover over) the center position 302(1).

At 300(5), the user may provide a touch input generally downwards and into the second portion 124(2) that is associated with altering tint, tone, or shade of the virtual object 120. In response to the input into the second portion 124(2), the color picker 124 may indicate that the second portion 124(2) of the color picker 124 for selecting the tint, tone, or shade has been activated. In addition, the tint, tone, or shade of the virtual object 120 may be updated to indicate the current tint, tone, or shade corresponding to the location (or position) of the touch input. However, it is to be appreciated that this while this example describes the input starting at the center position 302(1) and moving towards the second portion 124(2), in some instances the input may be received at the second portion 124(2) for enabling selection of the tint, tone, or shade or may begin at any other portion of the trackpad before moving to the second portion 124(2).

Additionally, as illustrated, the color picker 124 may be updated to illustrate a third portion 124(3) for selecting a brightness. In some instances, in response to the touch input being received in the outer position 302(4) that is within a region of outer positions associated with altering the tint, tone, or shade (or another position within the region of outer positions associated with altering the tint, tone, or shade), the color picker 124 may include the third portion 124(3) for selecting the brightness.

At 300(6), the user may provide a touch input down and to the left to another outer position 302(5), thus changing the value of the tint, tone, and/or shade. The second portion 124(2) of the color picker 124 may be updated to reflect the new selection. In addition, or in the alternative, the tint, tone, or shade of the virtual object 120 may be updated to reflect the selected tint, tone, or shade. Upon identifying the desired tint, tone, or shade, the user may provide a touch input towards the center position 302(1) or may remove the implement from the trackpad. At this point, the second portion 124(2) of the color picker 124 may no longer be activated for selecting a tint, tone, or shade of the virtual object 120.

Figure 3C:
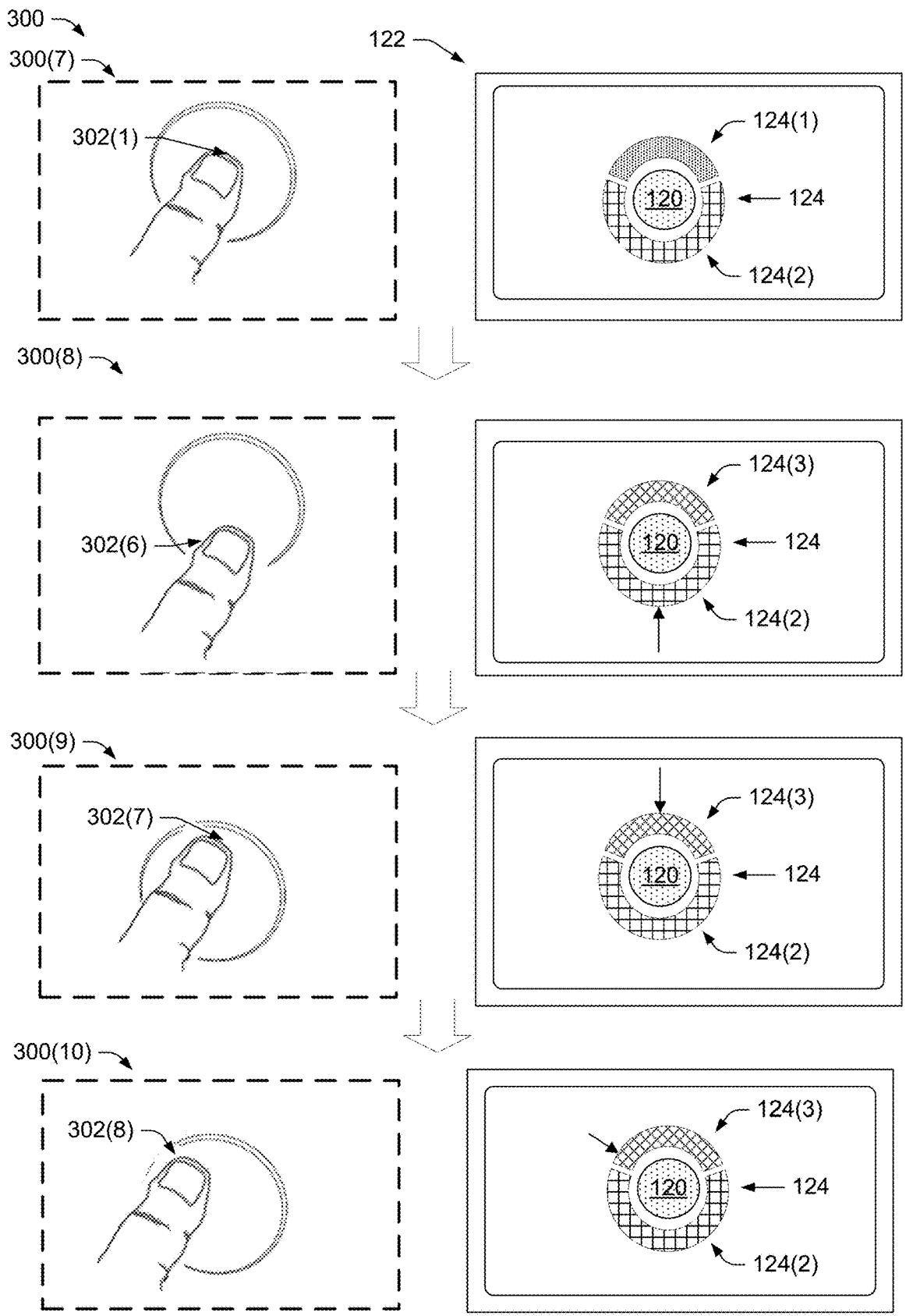
FIG. 3C illustrates an example flow of operations where the user provides an input to the trackpad at the second defined outer region and then into a third defined outer region to enable selection of another property, such as a brightness, of the virtual object. After this input is received, the user may use the trackpad or other input device to select the brightness using the presented color picker.

FIG. 3C continues the flow of operations 300 after the user has selected the desired hue and/or the tint, tone, or shade. The display 122 may display the color picker 124. At 300(7), the joystick may initially reside in the center position 302(1). As illustrated at 300(7), the display 122 may present the virtual object 120 according to the hue selected in FIG. 3A and/or the tint, tone, or shade selected in FIG. 3B. At 300(7), the touch input or the implement may initially reside in or otherwise correspond to (e.g., hover over) the center position 302(1).

At 300(8), the user may provide a touch input generally downwards and into the second portion 124(2) that is associated with altering tint, tone, or shade of the virtual object 120. In response to the input into the second portion 124(2), the color picker 124 may be updated to illustrate the third portion 124(3) for selecting the brightness. In other words, in some instances, altering or selecting a brightness may be accessed or made available by initially, providing touch input into the outer position 302(6) that is within a region of outer positions associated with altering the tint, tone, or shade. Here, the color picker 124 may no longer display the first portion 124(1), but instead, may display the third portion 124(3). In some instances, the third portion 124(3) may correspond to the first portion 124(1) in that the third portion 124(3) may replace the first portion 124(1).

At 300(9), the user may provide touch input that is generally upwards and into an outer position 302(7) that is within a region of outer positions associated with altering the brightness of the virtual object 120. Although FIG. 3C and 300(9) illustrate a particular touch input (e.g., directly upwards), in some instances, the user may scroll along an outer periphery or edge to reach the region associated with altering the third property. In other words, the user may avoid a center of the trackpad, scroll around the center position, and along an outer edge to reach a range of outer positions associated with altering the third property. In response to providing touch input into this region, the color picker 124 may indicate that the third portion 124(3) of the color picker 124 for selecting the brightness has been activated. In addition, the brightness of the virtual object 120 may be updated to indicate the current brightness corresponding to the location of the touch input.

In some instances, if the user desires to select a value associated with the brightness, as shown at 300(10), the user provides an input to the left to another outer position 302(8), thus changing the value of the brightness. As illustrated, the third portion 124(3) of the color picker 124 may be updated to reflect the new selection. In addition, or in the alternative, the brightness of the virtual object 120 may be updated to reflect the selected value. Upon identifying the desired hue, the user may provide an input towards the center position 302(1) or may simply remove the touch input (e.g., lift her finger from the trackpad).

Figure 3D:
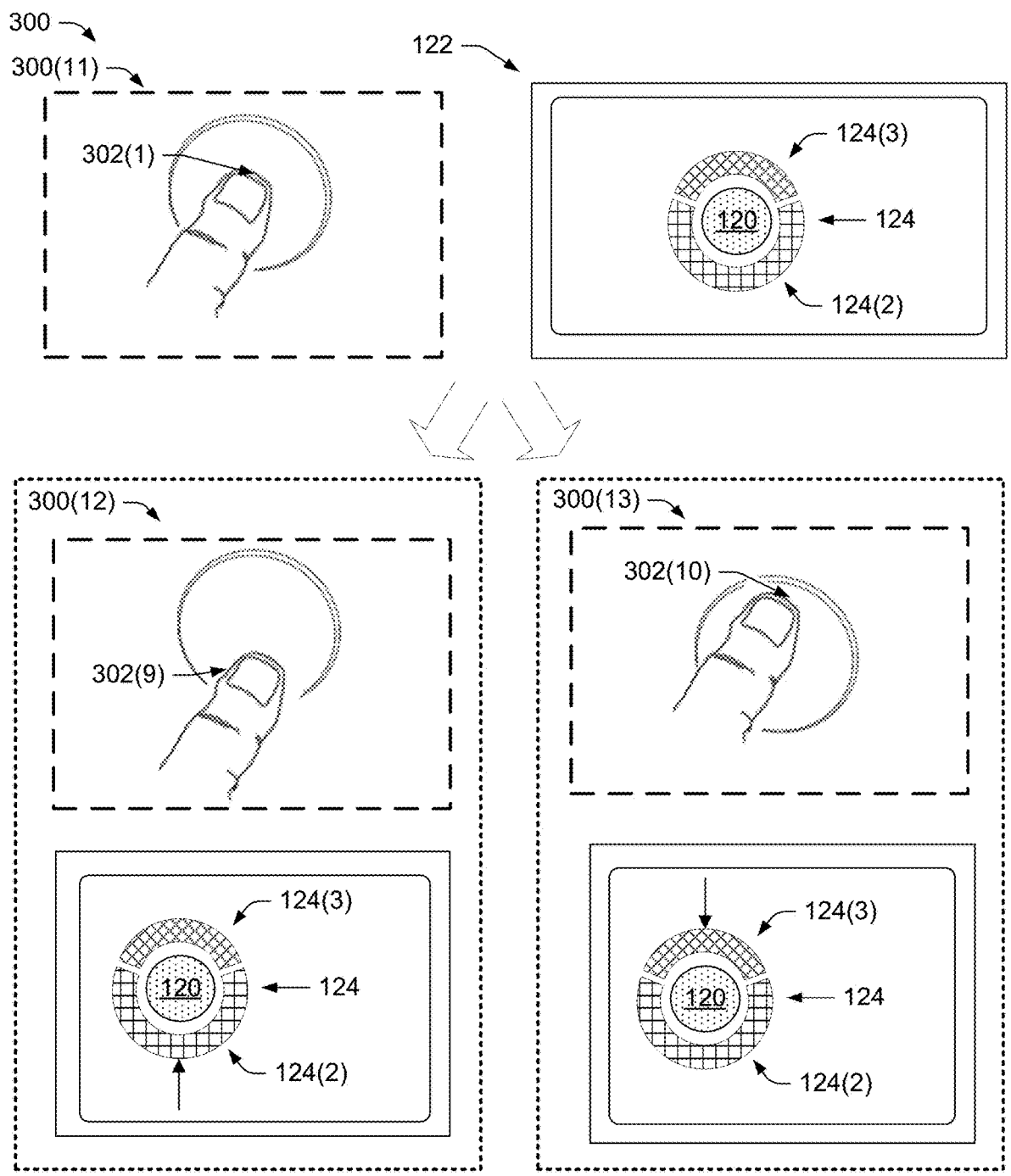
FIG. 3D illustrates as example flow of operations where the user provides an input to enable selection of one or more properties of the virtual object.

FIG. 3D continues the flow of operations 300 after the user has selected the desired brightness. At 300(11), the joystick may initially reside in the center position 302(1). As illustrated at 300(11), the display 122 may present the virtual object 120 according to the hue selected in FIG. 3A, the tint, tone, or shade selected in FIG. 3B, and the brightness selected in FIG. 3C. FIG. 3D also illustrates that initially, the color picker 124 may include the second portion 124(2) and the third portion 124(3).

From 300(11) the user may provide touch input generally downwards and into an outer position 302(9) that is within a region of outer positions associated with altering the tint, tone, or shade of the virtual object 120, as shown by 300(12), and/or may provide touch input generally upwards and into an outer position 302(10) that is within a region of outer positions associated with altering the brightness of the virtual object 120, as shown by 300(13). Therein, as discussed above, the user may alter the tint, tone, or shade, as discussed in FIG. 3B, or may alter the brightness, as discussed in FIG. 3C.

Figure 4:
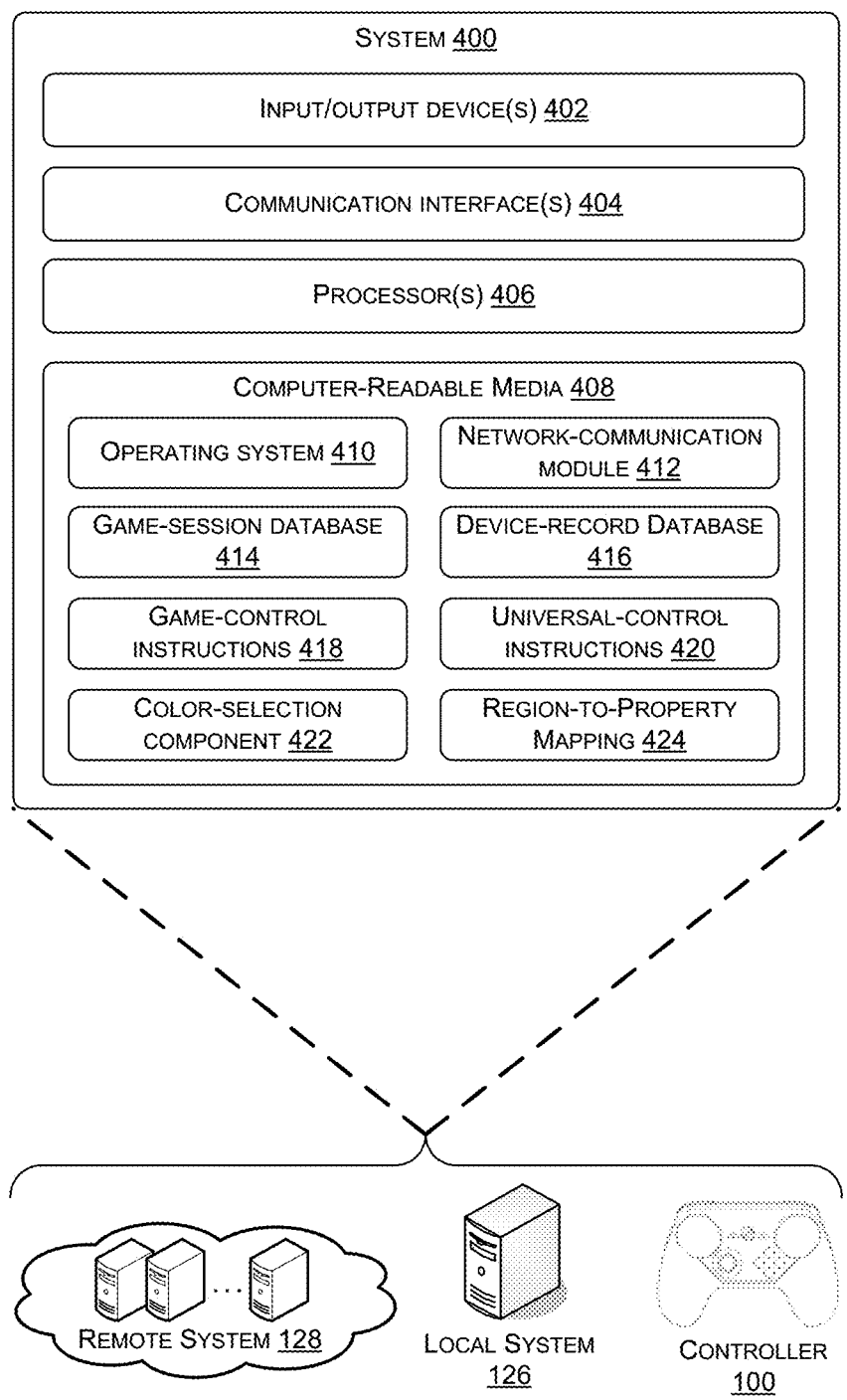
FIG. 4 illustrates example components of a system for performing the operations described herein. In some instances, these components may reside on the handheld controller, the local system, the remote system, and/or a combination thereof.

FIG. 4 illustrates example components of a system 400 for performing the operations described herein. In some instances, these components may reside on a handheld controller, a local system, a remote system, and/or a combination thereof.

As illustrated, one or more of the described systems (e.g., handheld controller, local system, remote system, etc.) may include one or more input/output (I/O) devices 402, such as the controls described above (e.g., joysticks, trackpads, triggers, detachable controls, fixed controls, etc.), and potentially any other type of input or output devices. For example, the I/O devices 402 may include one or more microphones to receive audio input, such as user voice input. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the system 400 may additionally or alternatively comprise any other type of output device.

In addition, the system 400 may include one or more communication interfaces 404 to facilitate a wireless connection to a network and/or to one or more remote systems (e.g., a host computing device executing an application, a game console, etc.). The communication interfaces 404 may implement one or more of various wireless technologies, such as Wi-Fi, Bluetooth, radio frequency (RF), and so on. It is to be appreciated that the system 400 may further include physical ports to facilitate a wired connection to a network, a connected peripheral device, or a plug-in network device that communicates with other wireless networks.

In the illustrated implementation, the system 400 further includes one or more processors 406 and computer-readable media 408. In some implementations, the processors(s) 406 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 406 may possess its own local memory, which also may store program modules, program data, and/or one or more operating systems.

The computer-readable media 408 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 408 may be implemented as computer-readable storage media ("CRSM"), which may be any available physical media accessible by the processor(s) 406 to execute instructions stored on the computer-readable media 408. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 406.

Several modules such as instruction, datastores, and so forth may be stored within the computer-readable media 408 and configured to execute on the processor(s) 406. A few example functional modules are shown as stored in the computer-readable media 408 and executed on the processor(s) 406, although the same functionality may alternatively be implemented in hardware, firmware, or as a system on a chip (SOC).

An operating system module 410 may be configured to manage hardware within and coupled to the system 400 for the benefit of other modules. In addition, the computer-readable media 408 may store a network-communications module 412 that enables the system 400 to communicate, via the communication interfaces 404, with one or more other devices, such as a personal computing device executing an application (e.g., a game application), a game console, a remote server, or the like. The computer-readable media 408 may further include a game-session database 414 to store data associated with a game (or other application) executing on the system 400 or on a computing device to which the system 400 couples. The computer-readable media 408 may also include a device-record database 416 that stores data associated with devices to which the system 400 couples, such as the personal computing device, game console, remote server or the like. The computer-readable media 408 may further store game-control instructions 418 that configure the system 400 to function as a gaming controller and universal-control instructions 420 that configure the system 400 to function as a controller of other, non-gaming devices (in instances where the system 400 comprises a controller).

In addition, the computer-readable media 408 may store a color-selection component 422 and a region-to-property mapping 424 that may function to enable the property-selection techniques described above. For instance, the color-selection component 422 may function to launch the color picker 124 described above upon receiving an instruction to do so. In addition, the color-selection component 422 may receive inputs from a handheld controller to determine which property is to be altered at a given time and the value to which the property is to be altered. For example, upon receiving an indication that an input (e.g., via an input device of a handheld controller) has been received corresponding a particular outer position of the input device while the color picker 124 is in operation, the color-selection component 422 may access the region-to-property mapping 424 to determine which property is to be modified. In addition, the color-selection component 422 may access the region-to-property mapping 424 upon receiving inputs to determine the value of the property to be modified. It is to be appreciated that the color-selection component 422 and/or the region-to-property mapping 424 may reside on the local system 126 (e.g., a computing device that directly couples to the display 122), the remote system 128 (e.g., server computing devices that couple to the display 122 and/or local system 126 over a network), a handheld controller 100 (e.g., that couples to the local and/or remote systems), and/or a combination thereof.

Figure 5A:
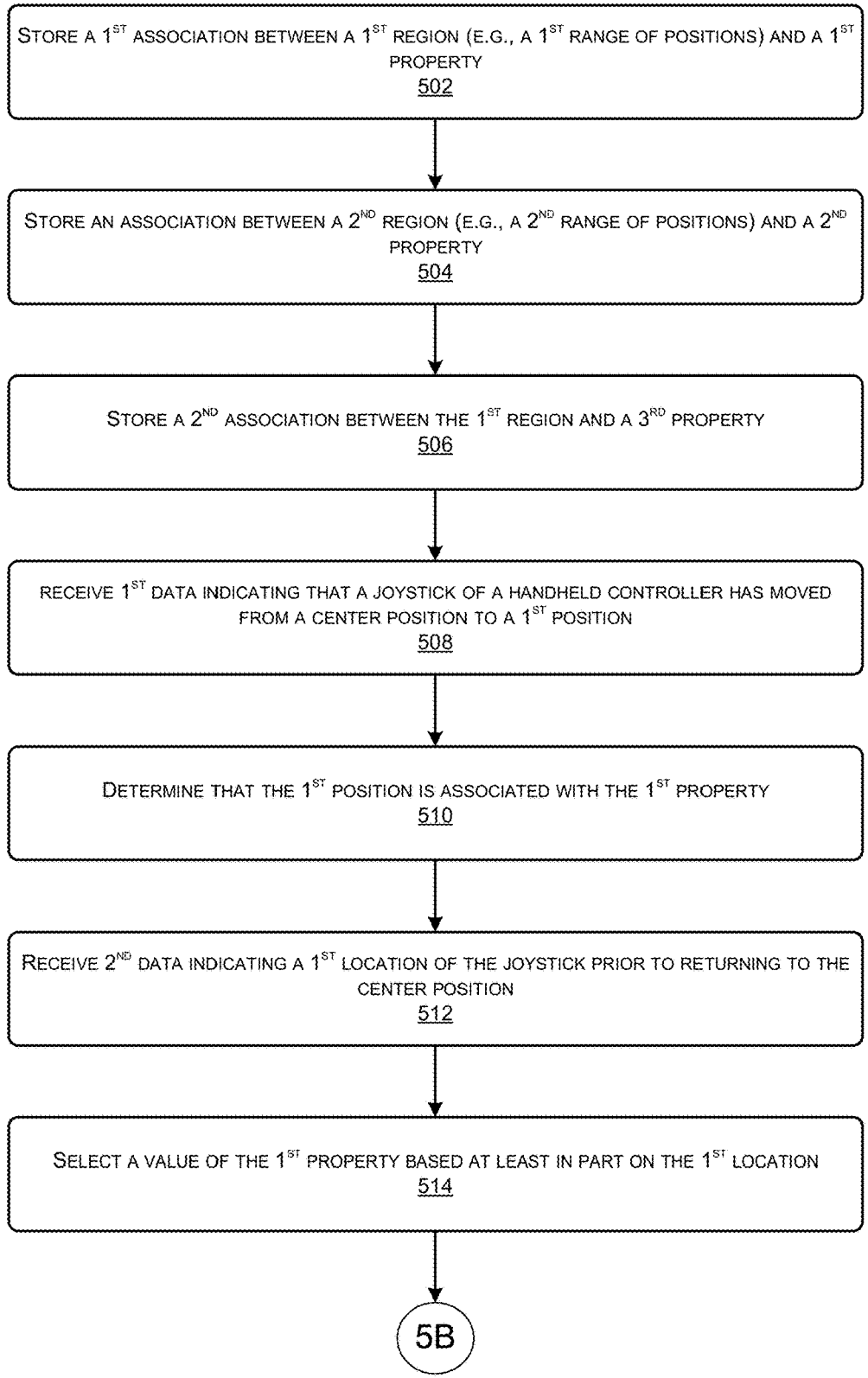
FIGS. 5A-5C collectively illustrate a flow diagram of an example process for using a joystick on a handheld controller to operate a color picker for modifying presentation of a virtual object on a display.
Figure 5B:
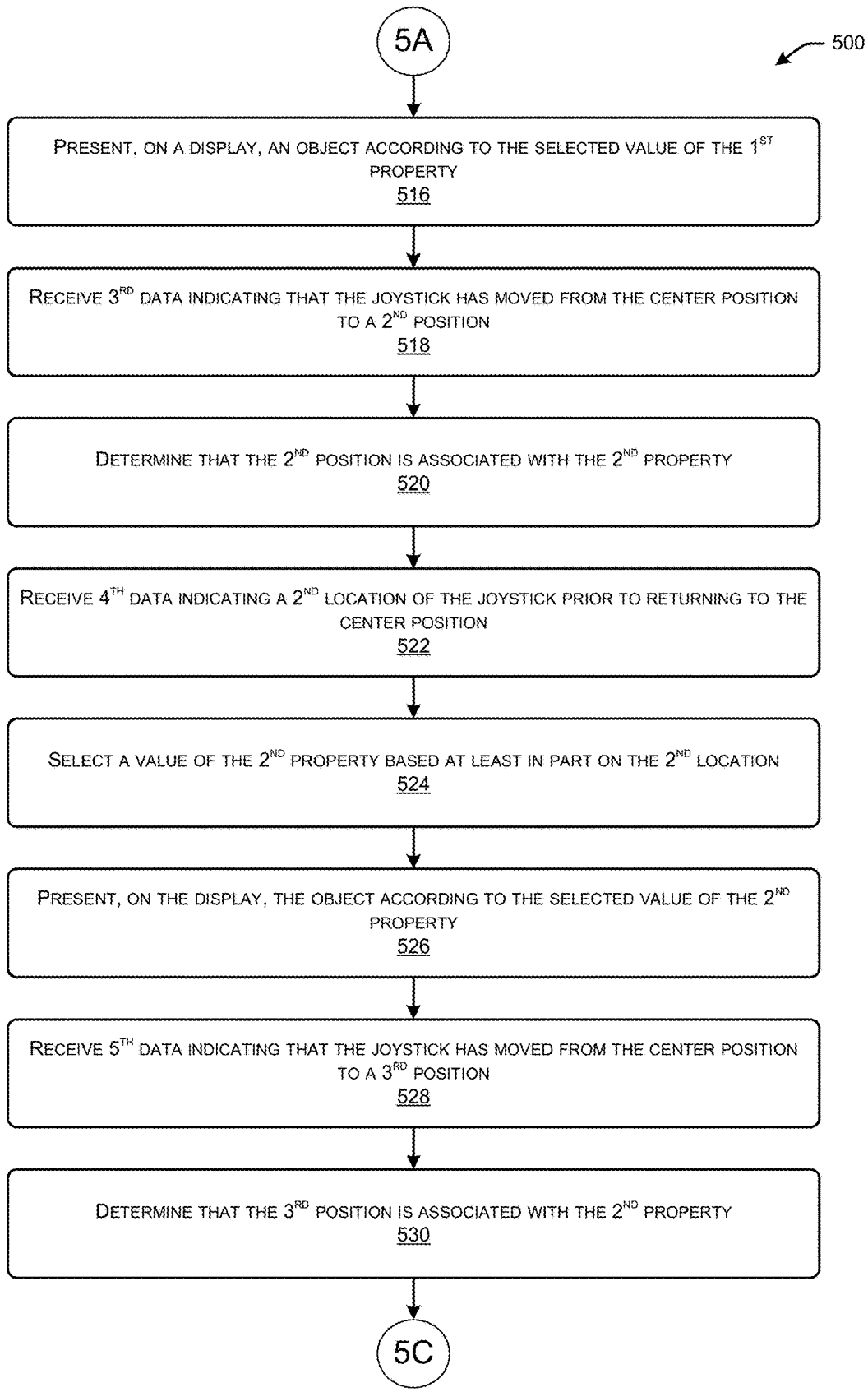
Figure 5C:
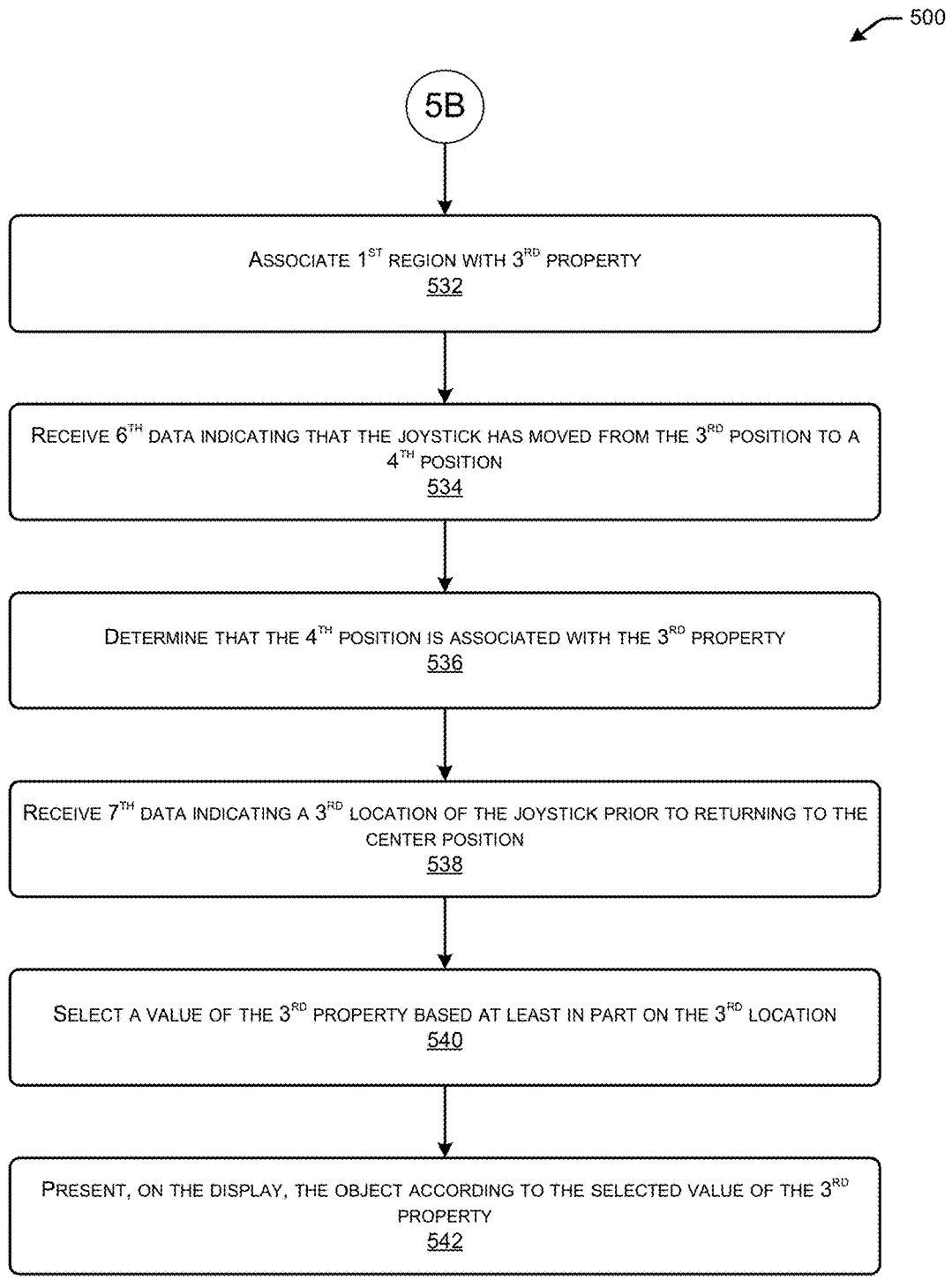

FIGS. 5A-5C collectively illustrate a flow diagram of an example process 500 for using a joystick on a handheld controller to operate a color picker for modifying presentation of a virtual object on a display. The process 500, as well as other processes described herein, is described as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Further, the operations may be performed by the handheld controller 100, the local system 126, the remote system 128, and/or any other system or combination of systems.

An operation 502 represents storing a first association between a first region (e.g., a first range of outer positions) and a first property for which a value may be selected (e.g., a hue). In some instances, the association between the first region and the first property may be during a first instance, or for a first period of time. For example, this operation may represent storing, in the region-to-property mapping 424, an indication of which X-Y positions of the joystick correspond to the first property during the first instance or the first period of time. At a first instance, the color picker 124 may include the first portion 124(1) in the region 118(1), or otherwise associated with the region 118(1).

An operation 504 represents storing an association between a second region (e.g., a second range of outer positions) and a second property for which a value may be selected (e.g., tint, tone, shade). For example, this operation may represent storing, in the region-to-property mapping 424, an indication of which X-Y positions of the joystick correspond to the second property.

An operation 506 represents storing a second association between the first region and a third property for which a value may be selected (e.g., brightness). For example, this operation may represent storing, in the region-to-property 424, an indication of which X-Y positions of the joystick correspond to the third property during the second instance or the second period of time.

An operation 508, meanwhile, represents receiving first data indicating that a joystick of a handheld controller has moved from a center position to a first outer position. The first outer position may be represented in X-Y coordinates or otherwise.

An operation 510 represents determining that the first outer position is associated with the first property. For example, the color-selection component 424 may compare the X-Y coordinates of the first outer position to the regions referenced in the region-to-property mapping 424 to determine that the first outer position is within the first portion 124(1) corresponding to the first property.

An operation 512 represents receiving second data indicating a first location of the joystick prior to returning to the center position, while an operation 514 represents selecting a value of the first property based at least in part on the first location. That is, the color-selection component 422 may receive an indication of a final location of the joystick prior to release of the joystick and returning to the center position. The color-selection component 422 may access the region-to-property mapping 424 and may determine, from the final-location value, the selected value of the first property, such as a hue value. It is to be appreciated that the color-selection component 422 may select (e.g., change) values of the property as the joystick is moved, after moving from the outer position and prior to returning to the center position.

FIG. 5B continues the illustration of the process 500 and includes, at an operation 516, presenting, on a display, an object according to the selected value of the first property. For example, the color-selection component 422 may cause display of an object according to the selected hue. In instances where the value of the property is selected as the joystick is moved (after moving from the outer position and prior to returning to the center position), the process 500 may present the object having the selected values as the joystick moves around. For example, as the user moves the joystick from a red hue to a green hue, the process 500 may present the object in an array of different colors corresponding to the current location of the joystick. The final-selection value, meanwhile, may correspond to the final location of the joystick prior to returning to the center position.

An operation 518 represents receiving third data indicating that a joystick of a handheld controller has moved from the center position to a second outer position. The second outer position may be represented in X-Y coordinates or otherwise.

An operation 520 represents determining that the second outer position is associated with the second property. For example, the color-selection component 422 may compare the X-Y coordinates of the second outer position to the regions referenced in the region-to-property mapping 424 to determine that the second outer position corresponds to the second property.

An operation 522 represents receiving fourth data indicating a second location of the joystick prior to returning to the center position, while an operation 524 represents selecting a value of the second property based at least in part on the second location. That is, the color-selection component 422 may receive an indication of a final location of the joystick prior to release of the joystick and returning to the center position. The color-selection component 422 may access the region-to-property mapping 424 and may determine, from the final-location value, the value of the second property, such as a tint, tone, or shade. It is to be appreciated that the color-selection component 422 may select (e.g., change) values of the second property as the joystick is moved, after moving from the outer position and prior to returning to the center position.

An operation 526 represents presenting, on a display, an object according to the selected value of the second property. For example, the color-selection component 422 may cause display of an object according to the selected tint, tone, or shade. In instances where the value of the property is selected as the joystick is moved (after moving from the outer position and prior to returning to the center position), the process 500 may present the object having the selected values as the joystick moves around. For example, as the user moves the joystick from a first tint, tone, or shade value to a second tint, tone, or shade value, the process 500 may present the object according to an array of different tint, tone, or shade values corresponding to the current location of the joystick. The final-selection value, meanwhile, may correspond to the final location of the joystick prior to returning to the center position.

An operation 528 represents receiving fifth data indicating that a joystick of a handheld controller has moved from the center position to a third outer position. The third outer position may be represented in X-Y coordinates or otherwise.

An operation 530 represents determining that the third outer position is associated with the second property. For example, the color-selection component 422 may compare the X-Y coordinates of the third outer position to the regions referenced in the region-to-property mapping 424 to determine that the third outer position corresponds to the second property.

FIG. 5C concludes the illustration of the process 500 and includes, at an operation 532, associating the first region with the third property. For example, based at least in part on determining that the third position is associated with the second property, the third property may be associated with the first region to permit the user to select the brightness.

An operation 534 represents receiving sixth data indicating that a joystick of a handheld controller has moved from the third position to a fourth outer position. The fourth outer position may be represented in X-Y coordinates or otherwise.

An operation 536 represents determining that the fourth outer position is associated with the third property. For example, the color-selection component 424 may compare the X-Y coordinates of the fourth position to the regions referenced in the region-to-property mapping 424 to determine that the fourth outer position corresponds to the third property.

An operation 538 represents receiving seventh data indicating a third location of the joystick prior to returning to the center position, while an operation 540 represents selecting a value of the third property based at least in part on the third location. That is, the color-selection component 422 may receive an indication of a final location of the joystick prior to release of the joystick and return to the center position. The color-selection component 422 may access the region-to-property mapping 424 and may determine, from the final-location value, the selected value of the third property, such as a brightness.

An operation 542 represents presenting, on a display, an object according to the selected value of the third property. For example, the color-selection component 422 may cause display of an object according to the selected brightness. Again, it is to be appreciated that the color-selection component 422 may select (e.g., change) values of the property as the joystick is moved, after moving from the outer position and prior to returning to the center position. Further, in instances where the value of the property is selected as the joystick is moved (after moving from the outer position and prior to returning to the center position), the process 500 may present the object having the selected values as the joystick moves around.

Figure 6:
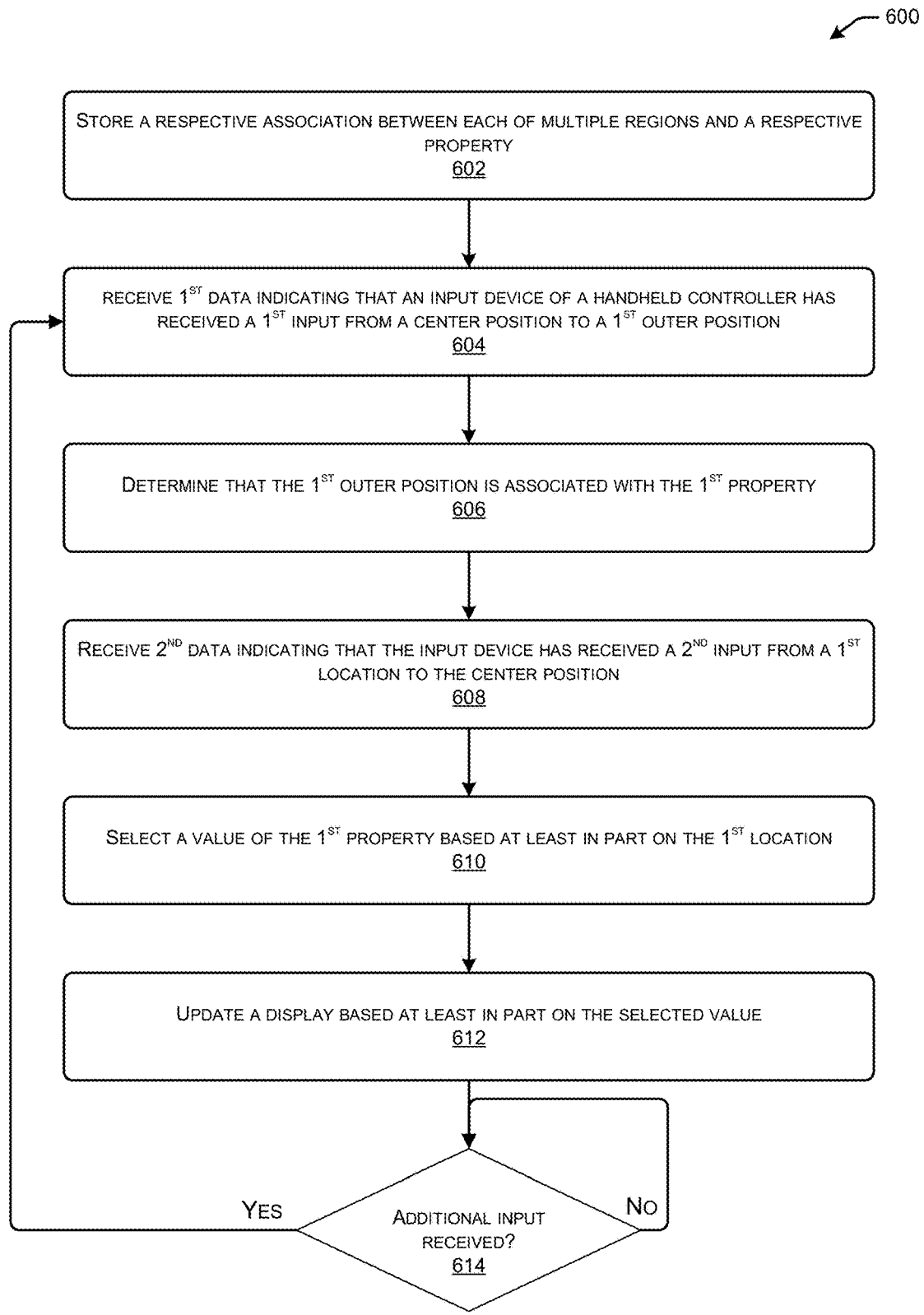
FIG. 6 illustrates a flow diagram of an example process for using an input device on a handheld controller to alter one or more properties of one or more virtual objects presented on a display.

FIG. 6 illustrates a flow diagram of an example process 600 for using an input device on a handheld controller to alter properties of one or more virtual objects presented on a display. The input device may comprise a joystick, a trackpad, a rollerball, or any other type of input device.

An operation 602 represents storing a respective association between regions and properties. For example, a first region on the input device may be associated with a first property, and so forth. Additionally, a first region on the input device may be associated with the first property during a first period of time (or instance), and another property during a second period of time (or instance).

An operation 604 represents receiving first data indicating that an input device of a handheld controller has received a first input, such as an input at a first position, an input from a center position to the first position, and so forth. This input may comprise a touch input on a trackpad, a movement of a joystick, and the like.

An operation 606 represents determining that the first position is associated with a first property, while an operation 608 represents receiving second data indicating that the input device has received a second input, such as an input at a first location, an input from the first location to the center position, and so forth. Again, this may comprise a touch input from a first location to the center location, a joystick moving from the first location to the center position, an input on a trackpad at the first location followed by removal of the input device (e.g., finger, stylus, etc.) from the trackpad, and the like.

An operation 610 represents selecting a value of the first property based at least in part on the first location. The value may comprise a color-related value (e.g., hue, brightness, lightness, value, saturation, shading, grayscale etc.), a text-related value (e.g., font size, font type, line spacing, etc.), or a value for any other type of property.

An operation 612, meanwhile, represents updating a display based at least in part on the selected value. For instance, an object may be presented according to the color-related value, text may be presented according to the text-related value, or the like.

An operation 614 represents determining whether an additional input has been received. If so, the process 600 may loop back to operation 604 and onwards for updating a value of a property based on received inputs and updating a display based on the updated value of the property.

Figure 7:
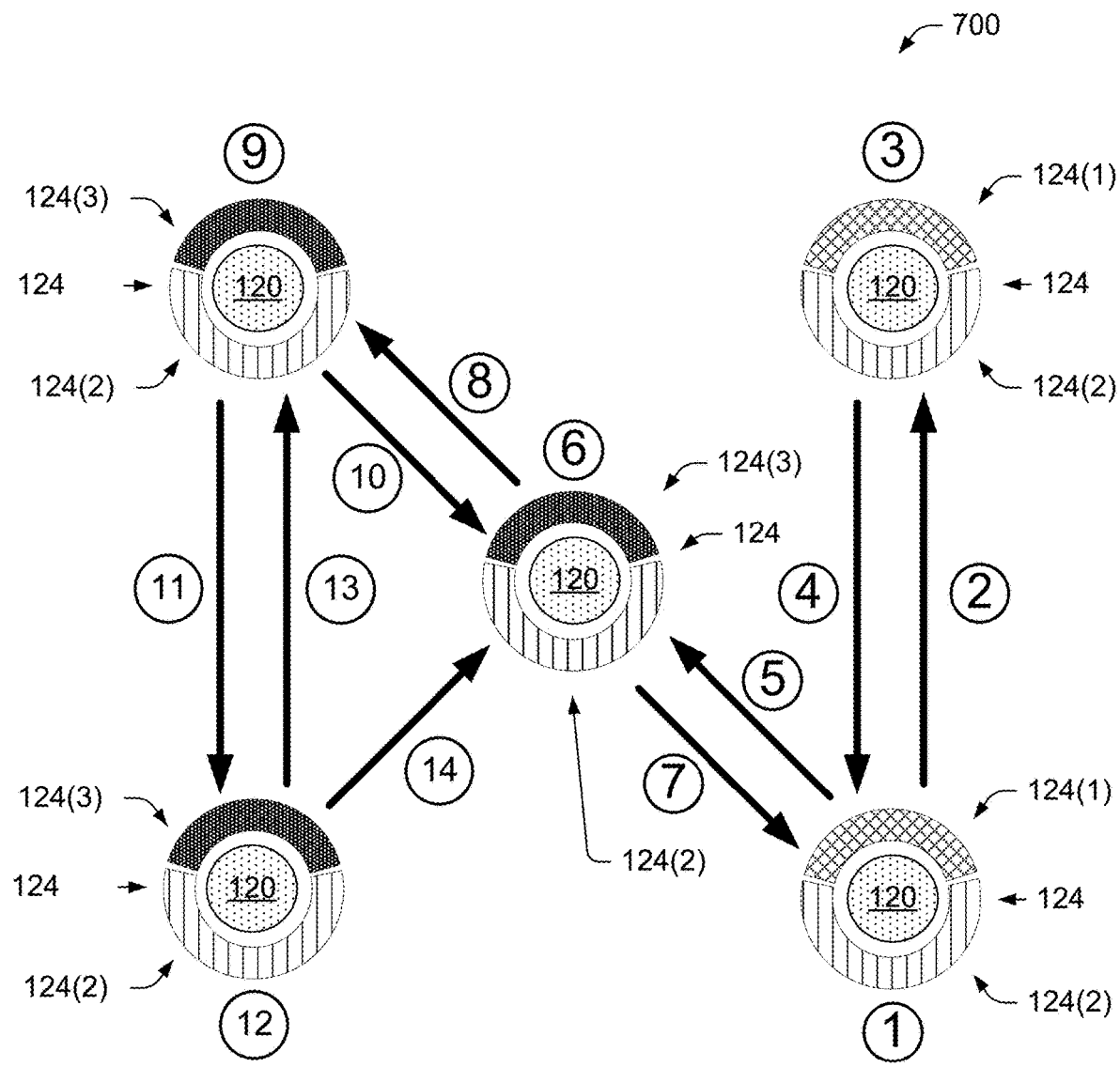
FIG. 7 illustrates an example flow of operations associated with selecting properties of a virtual object, such as hue, tint, tone, shade, and/or brightness.

FIG. 7 illustrates an example flow of operations 700 for selecting properties of content presented on a display 122. For example, the user may issue a request to launch a color picker 124 using a handheld controller or in any other manner. More particularly, FIG. 7 illustrates how the color picker 124 is updated based on the user input to a handheld controller, whether by a trackpad and/or a joystick. For ease, the flow of operations 700 is discussed with regard to moving the joystick, however, as discussed above, the flow of operations 700 may be implemented, or displayed, in response to the user operating a touchpad.

In some instances, initially, at "1", a display 122 may present a color picker 124 having a first portion 124(1) and a second portion 124(2). The first portion 124(1) may be associated with selecting a hue and the second portion 124(2) may be associated with selecting tints, tones, or shades of the hue. Additionally, the display 122 may present a virtual object 120 in accordance with the selected properties, as discussed herein.

At "2" a user may bias the joystick from a center position and generally upwards into an outer position that is within a region of outer positions associated with altering the hue of the virtual object 120. In some instances, in response to the joystick being moved into this region, the color picker 124 may indicate that the first portion 124(1) of the color picker 124 for selecting hue has been activated.

At "3" and within the first portion 124(1), the user may move the joystick to alter the value of the hue. That is, within the region associated with altering the hue, the user may move the joystick to select a desired hue (e.g., red, green, blue, etc.). In some instances, the color picker 124 may present a spectrum of hues within the first portion 124(1). In some instances, a predetermined number of hues may be presented and/or the spectrum of hues may represent equally sized portions (e.g., slices) within the first portion 124(1) that are selectable by the user. For example, in response to the user pressing the joystick upwards and into the first portion 124(1), the user may scroll through the spectrum of hues to select a desired hue. Moreover, a currently highlighted hue among the spectrum of hues may be accentuated. That is, as the user navigates the joystick within the first portion 124(1) and hovers above the hues, a currently highlighted or hovered hue may be accentuated. In addition, the hue of the virtual object 120 may be updated to indicate the current hue corresponding to the location of the joystick.

Upon identifying the desired hue at "3," the user may release the joystick at "4," causing the joystick to bias to the center position. At this point, at "1" the color picker 124 may display the first portion 124(1) indicating selectable hues and the second portion 124(2) may be updated to include various tints, shades, or tones associated with the selected hue (e.g., based on the selected hue at "3"). In some instances, the user may therein bias the joystick generally upwards and into an outer position that is within the region of outer positions associated with altering the hue of the virtual object 120 (i.e., the user may select a different hue).

Alternatively, at "5" the user may bias the joystick generally downwards and into an outer position that is within a region of outer positions associated with altering the tint, tone, or shade of the virtual object 120. In response to the joystick being moved into this region, the color picker 124 may indicate that the second portion 124(2) of the color picker 124 has been activated. Additionally, as discussed herein, the color picker 124 may be updated to include a third portion 124(3) associated with selecting a brightness.

At "6" and within the second portion 124(2), the user may move the joystick to select different tints, tones, or shades of the hue. That is, within this region, the user may move the joystick to select a desired a desired tint, tone, or shade of the hue. The tints, tone, and/or shades may be considered categories of saturation and brightness such that modifying the tints, tones, and/or shades modifies both saturation and brightness to values above zero. The second portion 124(2) includes a spectrum of tints, tones, and/or shades, which may be populated based at least in part on the selected hue. That is, after receiving an indication or selection of the desired hue, the second portion 124(2) may display the spectrum of tints, tones, or shades, where the spectrum of tints, tones, or shades are associated with the selected hue. In some instances, the spectrum of tints, tones, or shades may include a predetermined number of tints, tones, or shades. For example, the spectrum of tints, tones, and/or shades may include fifteen different options that are evenly distributed across tints (e.g., blends of selected hue and white), tones (e.g., blends of selected hue and gray), and shades (e.g., blends of selected hue and black). For example, the fifteen choices may include a single pure hue (full saturation and brightness), and multiple tints (varying in saturation, full brightness), tones (varying in saturation and brightness) and shades (full saturation, varying in brightness). Moreover, in some instances, the tints, tones, and/or shades may be presented in a predetermined order (e.g., light to dark, dark to light, etc.). Within the second portion 124(2), the tints, tones, and/or shades may represent equally sized portions (e.g., slices) that are selectable by the user. For example, in response to the user pressing the joystick downwards and into the second portion 124(2), the user may scroll through the spectrum of tints, tones, and/or shades. In some instances, moving through the second portion 124(2) may modifies both saturation and brightness to values above zero. The tint, tone, or shade of the virtual object 120 may be updated to indicate the current tint, tone, or shade corresponding to the location of the joystick.

Upon identifying the desired tint, tone, or shade at "6," the user may release the joystick at "7," causing the joystick to bias to the center position. At this point, at "1" the color picker 124 may display the first portion 124(1) indicating selectable hues and the second portion 124(2) may display the various tints, tones, or shades associated with the selected hue. In some instances, the user may therein bias the joystick generally upwards and into an outer position that is within the region of outer positions associated with altering the hue of the virtual object 120 (i.e., the user may select a different hue) or the user may bias the joystick generally downwards and into an outer position that is within the region of outer positions associated with altering the tint, tone, or shade of the virtual object 120 (i.e., the user may select a different tint, tone, or shade).

However, in some instances, at "6" the flow of operations 700 may continue to select a brightness of the hue. That is, in response to the joystick being biased generally downwards and into an outer position that is within the region of outer positions associated with altering the tints, tones, or shades of the virtual object 120 at "5," the color picker 124 may update to display the third portion 124(3) associated with altering the brightness. For example, from "6," the user, at "8," may bias the joystick generally upwards and into an outer position that is within a region of outer positions associated with altering the brightness of the virtual object 120. In some instances, the user may bias the joystick along an outer periphery of the joystick to reach the region of outer positions associated with altering the brightness (e.g., avoiding a center). In some instances, in response to the joystick being moved into this region, the color picker 124 may indicate that the third portion 124(3) of the color picker 124 for selecting the brightness has been activated. In some instances, the brightness values may include brightness values that have a saturation of zero such that user may exclusively select among greys. (of varying brightness, including black and white). Therefore, in some instances, the user may utilize the second portion 124(2) and/or the third portion 124(3) for modifying both saturation and brightness as they may be considered the same properties of the color.

Within the third portion 124(3), at "9" the user may move the joystick to alter the value of the brightness. In such instances, the third portion 124(3) may include a predetermined number of brightness. For example, the brightness spectrum may include nine different brightness values that are evenly distributed between full-white and full-black values. In some instances, the brightness spectrum may represent equally sized portions (e.g., slices) within the third portion 124(3) that are selectable by the user. For example, in response to the user pressing the joystick upwards (or around) and into the third portion 124(3), the user may scroll through the brightness spectrum to select a desired brightness. The brightness of the virtual object 120 may be updated to indicate the brightness corresponding to the location of the joystick.

In some instances, at "9" and while selecting the brightness or while with the region of outer positions associated with altering the brightness, the user may bias the joystick into the region of outer positions associated with altering the tints, tones, or shades of the virtual object 120 at "10". That is, at "9" the user may scroll from within the region of outer positions associated with selecting the brightness and, at "10," into the region of outer positions associated with altering the tint, tone, or shade of the virtual object 120. For example, the user may scroll along an outer periphery or edge to reach the region of outer positions associated with altering the tint, tone, or shade (e.g., avoiding the center). Therein, the user at "6" may select the tint, tone, or shade of the virtual object 120 and/or may release the joystick, causing the joystick to bias to the center position. In this sense, the user may move between selecting the tint, tone, or shade at "6" and selecting the brightness at "9." In some instances, here, the color picker 124 may represent a wheel that allows the user to scroll or switch between altering the tint, tone, or shade and the brightness (e.g., continuous choices). For example, although the second portion 124(2) and the third portion 124(3) are illustrates as being separate, or separated by a gap, in some instances, the user may be permitted to continuously scroll through the tint, tone, or shade and the brightness. In this sense, the color picker 124 may include a region population with tints, tones, and shades and a region populated with various brightnesses.

However, in some instances, at "9" and after selecting the brightness or while with the region of outer positions associated with altering the brightness, the user may release the joystick at "11", causing the joystick to bias to the center position at "12." That is, after identifying the desired brightness at "9", the user may release the joystick, causing the joystick to bias to the center position at "12".

From "12" the user at "13" may bias the joystick from the center position and generally upwards into an outer position that is within the region of outer positions associated with altering the brightness of the virtual object 120. Alternatively, from "12" the user at "14" may bias the joystick from the center position and generally downwards into an outer position that is within the region of outer positions associated with altering the tints, tones, or shades of the virtual object 120.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more computer-readable media storing computer-executable instructions that, when executed, cause the one or more processors to perform operations comprising:
associating a first range of outer positions of a joystick of a handheld controller with a first property;
associating a second range of outer positions of the joystick with a second property;
receiving first data indicating that the joystick has moved from a center position to within the first range of outer positions;
receiving second data indicating a first location of the joystick within the first range of outer positions;
receiving third data indicating that the joystick has moved from the first location to the center position;
selecting, based at least in part on receiving the third data, a value of the first property associated with the first location;
receiving fourth data indicating that the joystick has moved from the center position to within the second range of outer positions;
receiving fifth data indicating a second location of the joystick within the second range of outer positions;
receiving sixth data indicating that the joystick has moved from the second location to the center position; and
selecting, based at least in part on receiving the sixth data, a value of the second property associated with the second location.

2. The system as recited in claim 1, the operations further comprising:
associating the first range of outer positions with a third property based at least in part on receiving the fourth data indicating that the joystick has moved from the center position to within the second range of outer positions;
receiving seventh data indicating a third location of the joystick within the first range of outer positions;
receiving eighth data indicating that the joystick has moved from the third location to the center position; and
selecting, based at least in part on receiving the eighth data, a value of the third property associated with the third location.

3. The system as recited in claim 2, wherein:
the first property comprises a hue of a color;
the second property comprises at least one of a tint, tone, or shade of the color; and
the third property comprises a brightness of the color.

4. The system as recited in claim 3, the operations further comprising presenting, on a display, an object according to at least one of:
the value of the hue;
the value of the tint, tone, or shade; or
the value of the brightness.

5. The system as recited in claim 2, the operations further comprising:
storing a first association between the first range of outer positions and the first property, the first association representing that the first property corresponds to the first range of outer positions during a first period of time or first instance;
storing a second association between the second range of outer positions and the second property; and
storing a third association between the first range of outer positions and the third property, the third association representing that the third property corresponds to the first range of outer positions during a second period of time or second instance.

6. The system as recited in claim 5, wherein the first range of outer positions is approximately equal to the second range of outer positions.

7. A method comprising:
receiving first data indicating that an input device of a handheld controller has received a first input from a center position to a first position within a first range of outer positions;
determining that the first position is associated with a first property;
receiving second data indicating that the input device has received a second input from a second position within the first range of outer positions to the center position;
selecting, based at least in part on receiving the second data, a value of the first property associated with the second position;
receiving third data indicating that the input device has received a third input from the center position to a third position within a second range of outer positions;
determining that the third position is associated with a second property;

receiving fourth data indicating that the input device has received a fourth input from a fourth position within the second range of outer positions to the center position; and selecting, based at least in part on receiving the fourth data, a value of the second property associated with the fourth position.

8. The method as recited in claim 7, wherein:
the first property comprises a hue of a color; and
the second property comprises at least one of a tint, tone, or shade of the color.

9. The method of claim 7, wherein the value of the second property is based at least in part on the value of the first property.

10. The method as recited in claim 7, further comprising based at least in part on receiving the third data, associating at least a portion of the first range of outer positions with a third property.

11. The method as recited in claim 7, further comprising:
receiving fifth data indicating that the input device has received a fifth input from the center position to a fifth position within the second range of outer positions;
based at least in part on receiving the fifth data, associating at least a portion of the first range of outer positions with a third property;
receiving sixth data indicating that the input device has received a sixth input from the fifth position to a sixth position within the first range of outer positions;
receiving seventh data indicating that the input device has received a seventh input from the sixth position within the first range of outer positions to the center position; and
selecting, based at least in part on receiving the seventh data, a value of the third property associated with the sixth position.

12. The method as recited in claim 11, wherein:
the first property comprises a hue of a color;
the second property comprises at least one of a tint, tone, or shade of the color; and
the third property comprises a brightness of the color.

13. The method of claim 11, further comprising at least one of:
causing presentation of a first predetermined number of selectable values associated with the second property; and
causing presentation of a second predetermined number of selectable values associated with the third property of the color.

14. The method of claim 11, further comprising presenting, on a display, an object according to at least one of:
the value of the first property;
the value of the second property; or
the value of the third property.

15. The method of claim 7, further comprising:
receiving fifth data indicating that the input device has received a fifth input from the center position to a fifth position within the second range of outer positions;
based at least in part on receiving the fifth data, associating at least a portion of the first range of outer positions with a third property;
receiving sixth data indicating that the input device has received a sixth input from the fifth position to a sixth position within the first range of outer positions;
receiving seventh data indicating that the input device has received a seventh input from the sixth position within the first range of outer positions to the center position;

receiving eighth data indicating that the input device has received an eighth input from the sixth position to a seventh position within the second range of outer positions; and selecting an updated value of the second property based at least in part on the seventh position.

16. A system comprising:
one or more processors; and
one or more computer-readable media storing computer-executable instructions that, when executed, cause the one or more processors to perform operations comprising:
receiving first data indicating that an input device of a handheld controller has received a first input from a center position to a first position within a first range of outer positions;
determining that the first range of outer positions is associated with a first property;
receiving second data indicating that the input device has received a second input from a second position within the first range of outer positions to the center position;
selecting, based at least in part on receiving the second data, a value of the first property associated with the second position; and
determining values associated with a second property based at least in part on the value of the first property.

17. The system as recited in claim 16, wherein
a second range of outer positions is associated with the second property.

18. The system as recited in claim 16, the operations further comprising:
receiving third data indicating that the input device has received a third input from the center position to a third position;
determining that the third position is associated with the second property;
receiving fourth data indicating that the input device has received a fourth input from a fourth position to the center position; and
selecting, among the values, a value of the second property based at least in part on the fourth position.

19. The system as recited in claim 16, the operations further comprising:
receiving third data indicating that the input device has received a third input from the center position to a third position;
determining that the third position is associated with the second property;
receiving fourth data indicating that the input device has received a fourth input from the third position to a fourth position;
determining that the fourth position is associated with a third property;
receiving fifth data indicating that the input device has received a fourth input from a fifth position to the center position; and
selecting a value of the third property based at least in part on the fifth position.

20. The system as recited in claim 19, the operations further comprising based at least in part on receiving the third data, associating one or more positions associated with the first property with the third property.

* * * * *